United States Patent
Grosman et al.

(10) Patent No.: US 11,559,166 B2
(45) Date of Patent: Jan. 24, 2023

(54) BEVERAGE PREPARATION AND INFUSION SYSTEM

(71) Applicant: 2266170 Ontario Inc., Mississauga (CA)

(72) Inventors: Gabriel Grosman, Vaughan (CA); Scott Hanneson, Mississauga (CA); Massimiliano Valsecchi, Milan (IT)

(73) Assignee: 2266170 Ontario Inc., Mississauga (CA)

( * ) Notice: Subject to any disclaimer, the term of this patent is extended or adjusted under 35 U.S.C. 154(b) by 620 days.

(21) Appl. No.: 16/485,800

(22) PCT Filed: Feb. 14, 2018

(86) PCT No.: PCT/CA2018/050166
§ 371 (c)(1),
(2) Date: Aug. 14, 2019

(87) PCT Pub. No.: WO2018/148828
PCT Pub. Date: Aug. 23, 2018

(65) Prior Publication Data
US 2020/0046162 A1    Feb. 13, 2020

Related U.S. Application Data

(60) Provisional application No. 62/597,748, filed on Dec. 12, 2017, provisional application No. 62/481,340,
(Continued)

(51) Int. Cl.
*A47J 31/46*    (2006.01)
*A47J 31/053*   (2006.01)
(Continued)

(52) U.S. Cl.
CPC ........... *A47J 31/468* (2018.08); *A47J 31/053* (2013.01); *A47J 31/0668* (2013.01); *A47J 31/4482* (2013.01)

(58) Field of Classification Search
CPC ...... A47J 31/053; A47J 31/4482; A47J 31/46; A47J 31/468
(Continued)

(56) References Cited

U.S. PATENT DOCUMENTS 2,878,746 A    3/1959  Schwinger
3,095,801 A *  7/1963  Fogg ................. B65D 85/8043
                                                    99/312
(Continued)

FOREIGN PATENT DOCUMENTS

CN    201987327 U    9/2011
EP       2263502 A1  12/2010
(Continued)

OTHER PUBLICATIONS

International Search Report and Written Opinion in PCT/CA2018/050166 dated Apr. 17, 2018.
(Continued)

*Primary Examiner* — Reginald Alexander
(74) *Attorney, Agent, or Firm* — Manelli Selter PLLC; Edward Stemberger

(57) ABSTRACT

A machine is provided for preparing a desired beverage product from infusible materials. The machine includes a brew chamber that is adapted to hold the infusible materials, the brew chamber having an inlet and an outlet. An inlet tube is provided for transferring a fluid from a fluid receptacle to the inlet of the brew chamber and a dispensing tube is provided for transferring fluid from the outlet of the brew chamber to the receptacle. A fluid pump is provided for recirculating fluid through the brew chamber. In another
(Continued)

aspect, a machine is provided for preparing a desired beverage product containing a gas. The machine includes a fluid pump for recirculating fluid from a fluid receptacle through an inlet tube to a dispensing tube and back to said fluid receptacle. The machine further includes an air pump disposed between the inlet tube and the fluid pump for introducing air into said beverage fluid that is recirculated by said fluid pump. A pod for use with the machine is also provided.

29 Claims, 30 Drawing Sheets

Related U.S. Application Data filed on Apr. 4, 2017, provisional application No. 62/459,137, filed on Feb. 15, 2017.

(51) Int. Cl.
*A47J 31/06* (2006.01)
*A47J 31/44* (2006.01)

(58) Field of Classification Search
USPC .......................................................... 99/308
See application file for complete search history.

(56) References Cited

U.S. PATENT DOCUMENTS

| | | | |
|---|---|---|---|
| 3,671,273 A | 6/1972 | Gunter | |
| 3,683,790 A | 8/1972 | Black et al. | |
| 3,960,066 A | 6/1976 | LaRocco et al. | |
| 3,992,983 A | 11/1976 | Gasser et al. | |
| 5,312,637 A | 5/1994 | Midden | |
| 5,353,693 A | 10/1994 | Verhoven | |
| 5,415,080 A | 5/1995 | Charles et al. | |
| 5,464,574 A | 11/1995 | Mahlich | |
| 5,564,601 A | 10/1996 | Cleland et al. | |
| 6,196,422 B1 | 3/2001 | Tuyls et al. | |
| 6,661,968 B2 | 12/2003 | Beaulieu | |
| 6,719,175 B2 | 4/2004 | Mackenzie et al. | |
| 6,817,280 B2 | 11/2004 | Hall et al. | |
| 7,219,596 B2 | 5/2007 | Kief, Jr. | |
| 8,079,300 B2 | 12/2011 | Jing | |
| 8,176,840 B2 | 5/2012 | Jarisch | |
| 8,191,867 B2 | 6/2012 | Spiegel | |
| 8,272,319 B2 | 9/2012 | Jarisch et al. | |
| 8,640,605 B2 | 2/2014 | Hart | |
| 8,887,622 B2 | 11/2014 | Bentley et al. | |
| 9,144,342 B2 | 9/2015 | Choi et al. | |
| 9,271,605 B2 | 3/2016 | Boussemart et al. | |
| 9,295,357 B2 | 3/2016 | Tinkler et al. | |
| 9,295,360 B2 | 3/2016 | Dyavarasegowda et al. | |
| 9,332,874 B2 | 5/2016 | Webster et al. | |
| 9,474,406 B2 | 10/2016 | Smith et al. | |
| 9,504,348 B2 | 11/2016 | Windler et al. | |
| 2008/0115673 A1 | 5/2008 | Zelioli et al. | |
| 2010/0313765 A1 | 12/2010 | Hale | |
| 2012/0312174 A1 | 12/2012 | Lambert | |
| 2013/0189404 A1 | 7/2013 | Ha | |
| 2014/0004240 A1 | 1/2014 | Hatherell | |
| 2014/0072690 A1 | 3/2014 | Ha | |
| 2015/0223628 A1 | 8/2015 | Cheung et al. | |
| 2015/0366396 A1 | 12/2015 | Castleberry | |
| 2016/0106255 A1 | 4/2016 | Gordon et al. | |
| 2016/0360918 A1 | 12/2016 | Chen et al. | |
| 2017/0119195 A1 | 5/2017 | Al-Shaibani et al. | |
| 2018/0110363 A1 | 4/2018 | Glucksman | |
| 2021/0219766 A1* | 7/2021 | Glucksman | ............. A47J 31/52 |

FOREIGN PATENT DOCUMENTS

| | | |
|---|---|---|
| GB | 1227194 | 4/1971 |
| GB | 2505659 A | 3/2014 |
| WO | 2011138723 A1 | 11/2011 |
| WO | 2016126991 A1 | 8/2016 |
| WO | 2016207846 A1 | 12/2016 |
| XN | 2016097923 A1 | 6/2016 |

OTHER PUBLICATIONS

International Preliminary Report On Patentability in PCT/CA2018/050166 dated May 14, 2019.
BUNN My Cafe AP Auto Eject Pod Brewer retrieved from the Internet https://www.amazon.com/BUNN-Cafe-Auto-Eject-Brewer/dp/B004ZVNTNA on Dec. 18, 2017.
Keurig® K3000SE Comercial Brewing System retrieved from the Internet https://commercial.keurig.com/brewers/K3000se/ on Aug. 6, 2019.
European Search Report in EP 18753839.2 dated Dec. 18, 2018.

* cited by examiner

BEVERAGE PREPARATION AND INFUSION SYSTEM

FIELD

This specification relates to beverage preparation systems and in particular to systems and system components for preparing beverages from infusible materials and for preparing beverages containing an infused gas.

BACKGROUND

The following background discussion is not an admission that anything discussed below is citable as prior art or common general knowledge. The documents listed below are incorporated herein in their entirety by this reference to them.

Preparing products such as beverages from infusible materials such as coffee grounds, tea leaves or dried fruit pieces is made more difficult and time consuming when the conditions result in a slow rate of infusion. For example, it may be desirable to brew coffee or tea using ambient or cold water rather than hot water in order to enhance certain desirable attributes such as the "smoothness" of the taste and/or in order to facilitate the preparation of iced beverages. In another example, it may be desirable to steep large pieces of dried fruits, dried vegetables or whole-leaf tea rather than using small particulate materials in order to enhance the visual appeal of the infusible materials and/or to achieve certain desirable product attributes.

Conventional methods used to prepare products in these circumstances require extended periods of contact time between the precursor fluid and the infusible materials. For instance, whole-leaf tea may be steeped for 3 or more minutes and cold-brew coffee may be steeped for 12 or more hours.

One method of achieving higher levels of extraction in a shorter amount of time when preparing products such as beverages from infusible materials is to use recirculation of a fluid through a brew chamber. Conventional recirculation processes still require extended periods of contact time to achieve satisfactory results. Such systems also can be messy to operate and unsuitable for use in coffee shops or other commercial operations dispensing large volumes of beverages per day.

When designing a brew chamber for preparing beverages from infusible materials, one challenge is that it may be difficult to optimize the brew chamber size for varying amounts of infusible material. Another challenge is that it may be difficult for entrapped air to be removed from the brew chamber and for product to be fully purged from the brew chamber after brewing. Another challenge is that it may be difficult for the machine operator to remove spent infusible materials from the brew chamber after brewing.

When designing a portion-control pod for use in a high-pressure brewing system, one challenge is to select pod parameters that enable sufficient flow for efficient extraction while maintaining pressure and mechanical force requirements that allow for efficient mechanical construction and safe operation.

Preparing fresh beverages with dissolved nitrogen is a difficult, labor-intensive, time-consuming and expensive process. Typical methods include (i) putting the beverage into a keg and pressurizing with nitrogen gas, then storing over a period of time (typically 24 hours), with periodic shaking to speed up the dissolving of the nitrogen gas or (ii) infusing nitrogen through a diffusing stone into a pressurized keg over a period of time (typically 10-20 minutes). It is desirable to provide a more efficient and cost effective process for preparing nitrogen infused beverages. There is a need for a beverage preparation and infusion system that overcomes the problems with conventional beverage preparing machines such as one or more of the problems identified above.

SUMMARY

In one aspect the invention provides a machine for preparing a beverage product from infusible materials, the machine comprising:
a brew chamber adapted for containing infusible materials, said brew chamber having a fluid inlet and a fluid outlet;
an inlet tube for transferring fluid from a fluid receptacle to said fluid inlet of said brew chamber;
a dispensing tube for transferring fluid from said fluid outlet of said brew chamber to said fluid receptacle;
a fluid pump for recirculating fluid under high pressure through said brew chamber, said fluid pump receiving said fluid from said fluid receptacle through said inlet tube.

In another aspect the invention provides a machine for preparing a beverage product from infusible materials, the machine comprising:
a brew chamber adapted for containing infusible materials, said brew chamber having a fluid inlet and a fluid outlet;
a brewing wand having an inlet tube, for transferring fluid from a first fluid receptacle to said fluid inlet of said brew chamber, and a dispensing tube for transferring fluid from said fluid outlet of said brew chamber to said first fluid receptacle;
a nitro wand having an inlet tube, for transferring fluid from a second fluid receptacle, and a dispensing tube, for transferring fluid to said second fluid receptacle;
a first fluid pump connected to said brewing wand for recirculating fluid under high pressure through said brew chamber, said fluid pump receiving said fluid from at least one of an external fluid source and said fluid receptacle;
a second fluid pump connected to said nitro wand for recirculating fluid under high pressure from said inlet tube of said nitro wand to said dispensing tube of said nitro wand;
a gas inlet disposed between said inlet tube of said nitro wand and said outlet tube of said nitro wand for introducing gas into said fluid that is recirculated by said second fluid pump.

In another aspect the invention provides a machine for preparing a beverage product, the machine comprising:
an inlet tube for removing a beverage fluid from a fluid receptacle;
a dispensing tube for depositing a beverage fluid into said fluid receptacle;
a fluid pump disposed between said inlet tube and said outlet tube for recirculating fluid under high pressure from said fluid receptacle through said inlet tube to said dispensing tube and back to said fluid receptacle;
a gas inlet disposed between said inlet tube and said fluid pump for introducing gas into said beverage fluid that is recirculated by said fluid pump.

In another aspect the invention provides a wand for a beverage preparation system comprising:
an inlet tube for removing a beverage fluid from a fluid receptacle;
a dispensing tube for depositing a beverage fluid into said fluid receptacle;

connectors disposed respectively on said inlet tube and said dispensing tube for connecting said inlet tube and said dispensing tube to corresponding fluid lines of the beverage preparation system.

In another aspect the invention provides a brew chamber for a machine for preparing beverages from a pod containing infusible materials, the brew chamber comprising:
a sidewall, base and lid defining a chamber for receiving the pod, said base being moveable relative to said lid to change the size of the chamber and to facilitate ejection of the pod from the chamber following use in the machine;
a mechanism for moving said base relative to said lid and said sidewall;
a mechanism for tilting said base when said base is moved sufficiently away from said lid and said sidewall to allow said pod to be ejected from said brew chamber.

In another aspect the invention provides a pod for preparing beverages from infusible materials using a high pressure beverage preparation machine, said pod comprising:
a first filter material and a second filter material sealed together to define an interior space, said first filter material and said second filter material having sufficient tensile strength to withstand the pressure in the high pressure beverage preparation machine;
infusible materials disposed in said interior space for preparing a desired beverage.

In another aspect the invention provides a method for preparing a beverage using a beverage preparation system, said method comprising the steps of:
depositing a pod of infusible materials into a brew chamber of the beverage preparation system; and
recirculating a fluid under high pressure through said pod of infusible materials disposed in said brew chamber, said fluid being circulated from said brew chamber to a receptacle and then back through said brew chamber multiple times until a desired beverage product is prepared.

In another aspect the invention provides a method for preparing a beverage using a beverage preparation system, said method comprising the steps of:
drawing a fluid from a fluid receptacle using a fluid pump;
mixing a gas with the fluid prior to the fluid passing through the fluid pump;
dispensing the fluid and gas mixture back into the fluid receptacle;
repeating the above steps for a desired time period until a desired beverage is prepared.

The system allows the preparation of products such as beverages from infusible materials by recirculating a fluid through a brew chamber to achieve higher levels of extraction in a shorter amount of time. Optional features are also disclosed which enable the product to be cooled and/or infused with a dissolved gas and/or held for dispensing within the same machine used to prepare the product. Optional portion-control package designs are also disclosed which further simplify the preparation of the product and the disposal of spent infusible materials.

Infusible materials may include natural foodstuffs such as roasted coffee beans, tea leaves, dried fruit pieces, dried vegetable pieces, bone meal, dried meat, bean curd, herbs and/or cocoa products. They may also include inert materials such as plastic pellets or cellulose fibre. They may also include soluble materials such as sugar, other natural or artificial sweeteners, milk powder, non-dairy whitener, dried fruit juice, dried flavorings and/or extracts. They may also include liquid materials such as syrups or liquid concentrated products. They may include a single material only or a combination of two or more materials.

Infusible materials may be introduced to the brew chamber of the machine through various means. For example, the infusible materials may be packaged in a single-use or reusable filter pack comprising one or more layers of filter material. The filter material may be folded back on itself to create one or more layers. The layers of filter material may be sealed one to the other along perimeter edges or at other locations to create interior space(s) to contain one or more type of infusible material. The permeability of the filter materials may differ from one layer to the other, or may vary between different zones of the layer. For example, a thermoforming process may be used to simultaneously form a layer to a desired shape and modify the permeability of that layer in different zones. Permeability of the filter layers may be designed to encourage fluid flow in a desired manner, for instance to improve evenness of extraction. A portion of the filter pack may be designed to be captured between the lid and body portions of the brew chamber, for instance to minimize the potential for fluid to channel around the filter pack. Filter material may be manufactured from or include biodegradable and/or compostable materials such as natural fibres, biodegradable plastics or bioplastics such as PLA. Filter pack shape may be designed to provide improved structural integrity during brewing. The filter pack shape may be designed to interface with supporting elements of the brew chamber to improve structural integrity during brewing. One or more filter packs may be packaged in an oxygen-barrier overwrap.

In another example, the infusible materials may be packaged in a single-use or reusable capsule with a cup portion comprising a base, a substantially frustoconical or cylindrical sidewall and a rim, and a lid portion permanently or removably affixed to the rim. The cup and lid may be manufactured of similar or dissimilar materials, including aluminum, thermoformed plastic, injection-molded plastic or plastic film. The lid may include a pull tab for removal after product preparation, to simplify the separation of capsule components for recycling and/or composting. The rim may include a portion designed to be snapped off after product preparation, to simplify the removal of the lid and subsequent recycling and/or composting of capsule components. Capsule components may be manufactured from or include a layer of an oxygen-barrier material such as EVOH or PBT. Alternatively, one or more capsules may be packaged in an oxygen-barrier overwrap. Capsule components may be manufactured from or include biodegradable and/or compostable materials such as natural fibres, biodegradable plastics or bioplastics such as PLA. The capsule may include a filter element made of paper, non-woven synthetic material, mesh, microperforated film, microperforated injection-molded plastic, or other material. The filter may take the place of the lid, be adhered to the lid, adhered to the cup, sandwiched between the lid and the cup, press-fit into the cup or placed loosely into the capsule. The capsule may include element(s) to aid in fluid dispersion before and/or after passing through the infusible materials, for example to increase evenness of extraction or to improve fluid drainage from the capsule. The capsule may include additional elements to isolate one or more type of infusible material from another type of infusible material or from another interior portion of the capsule. The capsule may include piercing elements designed to pierce the lid, cup or other portion of the capsule prior to brewing, when loading the capsule into the brew chamber, or during brewing. The cup and/or lid portion may include structural features such as raised bumps or ridges designed to interface with the brew chamber, create channels between the capsule and the brew chamber, support interior elements of the capsule, increase structural strength of the capsule, increase flexibility of the capsule and/or aid in handling, stacking and/or separation of capsule components during the manufacturing process. The capsule may be designed to have fluid introduced into the capsule through one or more piercings of the lid or cup and to have fluid exit the capsule through one or more piercings of the lid or cup. These piercings may be pre-existing in the capsule and/or they may be created prior to brewing (for instance, by removing the lid from the capsule to expose a filter element) and/or they may be created during loading of the capsule into the brew chamber (for instance by piercing the lid and/or cup with hollow probe(s), solid probe(s) and/or blade(s)), and/or they may be created during brewing (for example, by using fluid pressure to force a component of the capsule against a piercing element of the capsule and/or brew chamber). The capsule may be designed so that a filtering structure is formed by the interface of piercing elements within the capsule and/or the brew chamber and a pierced element of the capsule, such as the cup or the lid.

In another example, the infusible materials may be packaged in a portion pack that is opened by the user and manually added to the brew chamber prior to brewing. Portion pack components may be manufactured from or include a layer of an oxygen-barrier material such as aluminum, EVOH or PBT. Portion pack components may be manufactured from or include biodegradable and/or compostable materials such as natural fibres, biodegradable plastics or bioplastics such as PLA.

In another example, the infusible materials may be packaged in a multi-dose package that is designed to dispense pre-measured portions or designed to allow the user to measure out a desired portion. Multi-dose package components may be manufactured from or include a layer of an oxygen-barrier material such as aluminum, EVOH or PBT.

In another example, the infusible materials may be loaded into the machine in bulk. The machine may include means of automatically measuring a dose of infusible materials or for allowing a user to measure a desired dose. The machine may include automatic means of modifying the infusible materials prior to product preparation, for example a portion of whole bean roasted coffee beans may be automatically ground to a desired particulate size prior to introduction into the brew chamber.

Fluid supply source may be a manually-filled supply tank, an automatically filled supply tank or a direct connection to a supply system such as water plumbing.

Cooling of the fluid supply and/or the product can be provided by various means (not shown), including direct or indirect electromechanical or piezoelectric cooling, the use of electromechanical cooling to partially freeze fluid in a supply tank (i.e. an "ice bank"), the use of stored cooling in a phase-change material, direct addition by manual or automatic means of frozen materials such as water ice to the incoming fluid, or direct addition by manual or automatic means of frozen materials such as water ice to the product receptacle. Cooling may take place prior to, during or after brewing.

Heating of the fluid supply and/or the product can be provided by various means (not shown), including direct or indirect electrical or electromechanical heating, the use of stored heat in a phase-change material, heating with an intermediate heat-exchange fluid such as water, steam or propylene glycol, or through the direct addition of heated and/or vaporized fluid such as water steam. Heating may take place prior to, during or after brewing, and may be used in conjunction with cooling, for example to enable brewing at an elevated temperature for optimal extraction followed by cooling to a desirable serving temperature.

The machine may include means of ejecting a filter pack, capsule or a portion of spent infusible material to a waste container. The brew chamber may also include a single-use filter element to aid in product preparation and/or disposal of spent infusible materials (for instance, a roll of filter material that passes through the brew chamber and is advanced after opening the brew chamber at the end of the product preparation sequence, carrying the portion of spent infusible materials with it to the waste container). The ejection may take place automatically either (i) after the product preparation is complete, (ii) as one of the first steps in the next product preparation sequence or (iii) as a step in the product preparation sequence (for instance, to allow a rinsing of the brew chamber and associated plumbing after extraction but before completion of the product preparation sequence). Alternatively, ejection may take place manually whenever the brew chamber is next opened by the user.

The machine may include means of introducing air, nitrogen, nitrous oxide or other gas/gasses to the fluid and/or product, for instance to enhance the amount of foam/crema produced or to dissolve gasses into the product so that a cascade of micro-bubbles is released upon dispensing of the product. These gasses may be introduced prior to the pump inlet, so that the pressure and shear forces encountered in the pump and brew chamber will speed up the dissolving of these gasses into the fluid or product.

Various factors ("Recipe Factors") may be adjusted in order to impact the concentration, temperature, volume or other attributes of the product. These factors include the type and portion of infusible material(s) used, the granular size of the infusible material used and/or the size distribution of the infusible material particles, stratification of different particle sizes of infusible material within the capsule, filter pack or brew chamber, the quantity of fluid used, the speed and timing of introduction of fluids to the machine, the temperature of fluid used, the amount, pressure and timing of gasses introduced to the fluid and/or product, the pressure applied to the fluid and/or product at various stages of the preparation cycle and/or in various regions within the machine, the speed, flowrate, timing, direction of flow through the brew chamber and pulsing sequence of recirculation within the machine.

These factors may be adjusted from machine to machine, product to product and/or preparation to preparation. The adjustment may be done automatically through portion control, automatic machine adjustment based on packaging material attributes or markings or automatic adjustment based on user selected options on the machine's operator interface. The adjustments may also be done manually by the user. For example, these factors may be adjusted to produce product at a ready-to-consume concentration. Alternatively, these factors may be adjusted to produce concentrated product suitable for later dilution with other food products such as water, ice, milk, cream, soda, alcoholic beverages or ice cream, or for use as an ingredient in food or beverage preparation. A more concentrated product may also be produced by reloading fresh infusible material into the brew chamber and completing one or more additional preparation sequences using the same fluid/product. Producing a concentrate may enhance desirable flavor attributes, decrease storage space required and/or increase the range of food and/or beverage products that can be produced.

The machine may be equipped with a means of drawing fluid and/or product from the serving container (such as a jug or glass) into the machine, so that fluid and/or product can be recirculated from the container, through the brew chamber and back to the container two or more times before the completion of a product preparation sequence.

The machine may be equipped with an internal tank for holding a quantity of fluid and/or product, with means provided to recirculate fluid and/or product from said tank, through the brew chamber and back to said tank two or more times before completion of a product preparation sequence. This tank may be equipped with means of measuring the volume of fluid and/or product it contains, such as capacitive level probe(s), level float(s), sight gauge(s), magnetic float(s), hydrostatic pressure sensor(s), vibrating point sensor(s), conductivity sensor(s), ultrasonic sensor(s), optical sensor(s) and/or bubbler sensor(s). The tank may be equipped with means of controlling internal tank pressure, such as the supply of regulated gas to the tank, a pressure-relief valve or an air break device, and such means may be controlled or adjusted manually or automatically at various points in the product preparation cycle. The machine may be equipped with means of adjusting and controlling the temperature of the tank, such as a refrigerated and insulated compartment around the tank.

The machine may be equipped with means of measuring product strength, such as optical or conductivity sensor(s) or means of measuring the flow of fluid and/or product, such as an in-line flowmeter on the fluid supply line. The machine may use any of its sensor inputs to affect information displayed to the user or to adjust one or more Recipe Factors for the current or future product preparation cycle(s).

Other aspects and features of the teachings disclosed herein will become apparent, to those ordinarily skilled in the art, upon review of the following description of the specific examples of the specification.

DRAWINGS

The drawings included herewith are for illustrating various examples of articles, methods, and apparatuses of the present specification and are not intended to limit the scope of what is taught in any way. For simplicity and clarity of illustration, where considered appropriate, reference numerals may be repeated among the drawings to indicate corresponding or analogous elements.

Figure 21:
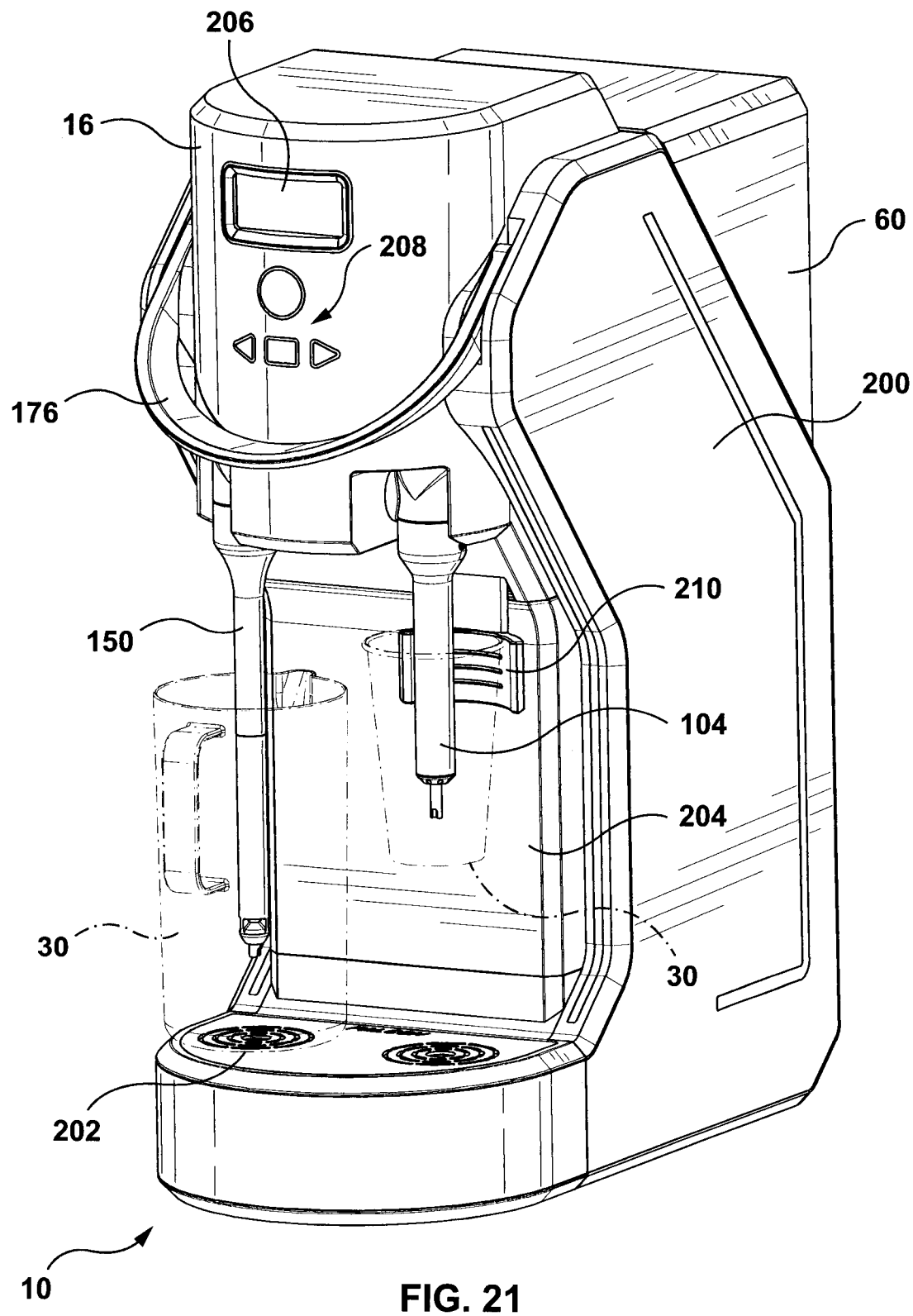
FIG. 21 is a perspective view of a beverage preparation system in accordance with another embodiment of the present invention.
Figure 27A:
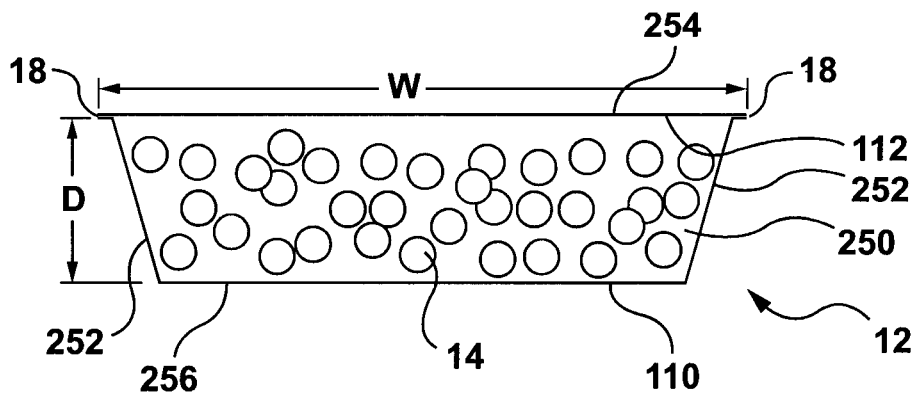
Figure 27B:
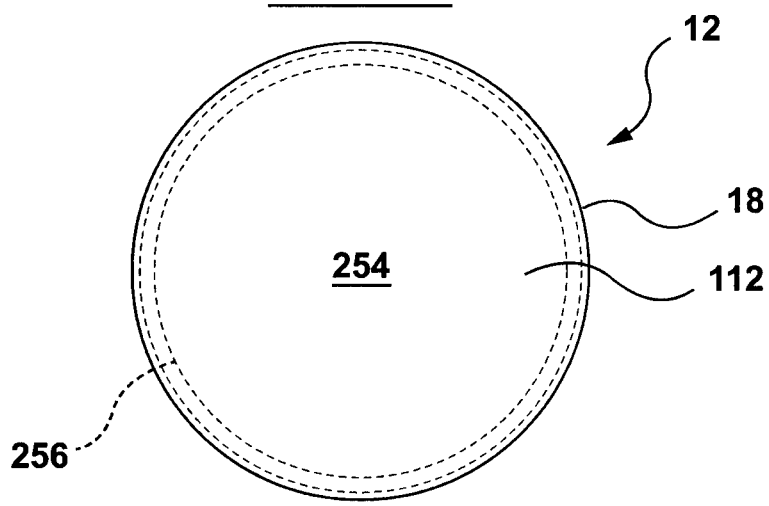
Figure 27C:
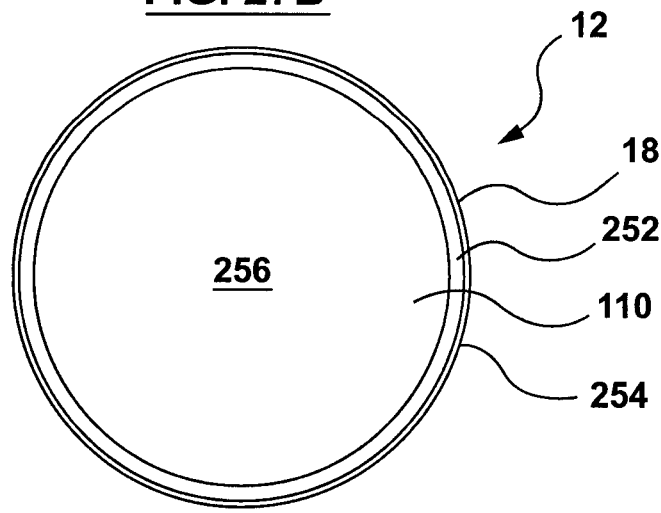
Figure 28:
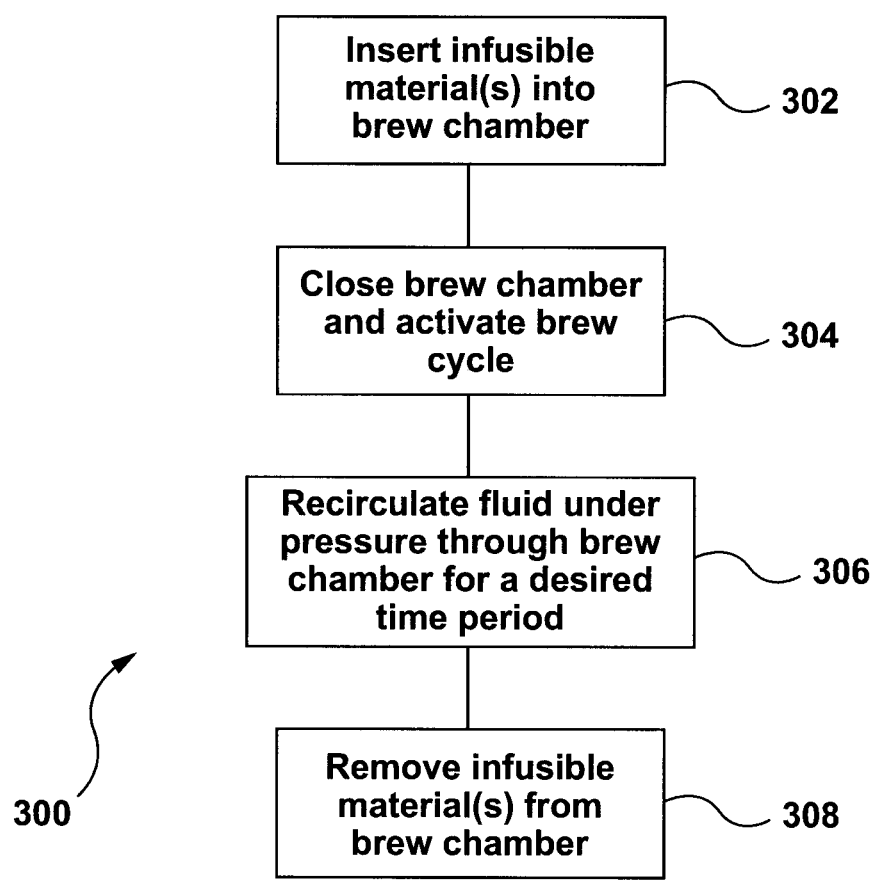
Figure 29:
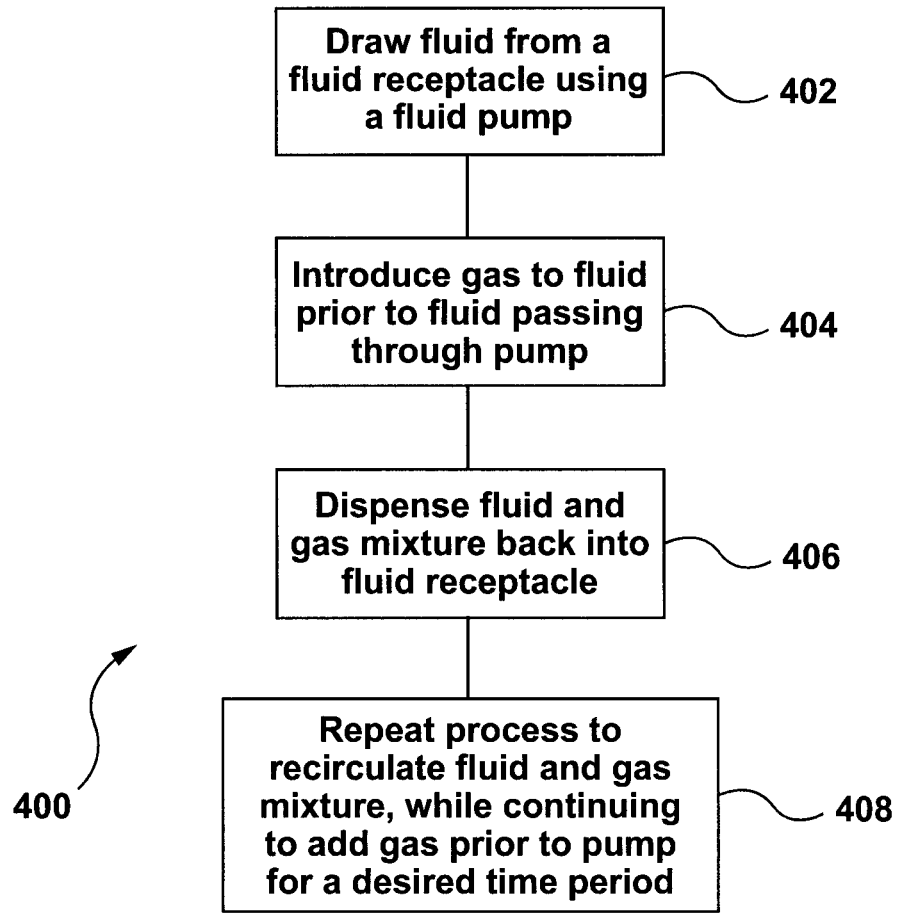

FIGS. 27A-C are sectional, top and bottom views respectively of a pod preferred for use with the machine of FIG. 21;

FIG. 28 is a flow diagram of a method for preparing a beverage in accordance with the invention; and FIG. 29 is a flow diagram of a method for preparing a beverage in accordance with another embodiment of the invention.

DESCRIPTION OF VARIOUS EMBODIMENTS

Various apparatuses or methods will be described below to provide examples of the claimed invention. The claimed invention is not limited to apparatuses or methods having all of the features of any one apparatus or method described below or to features common to multiple or all of the apparatuses described below. The claimed invention may reside in a combination or sub-combination of the apparatus elements or method steps described below. It is possible that an apparatus or method described below is not an example of the claimed invention. The applicant(s), inventor(s) and/or owner(s) reserve all rights in any invention disclosed in an apparatus or method described below that is not claimed in this document and do not abandon, disclaim or dedicate to the public any such invention by its disclosure in this document.

Figure 1:
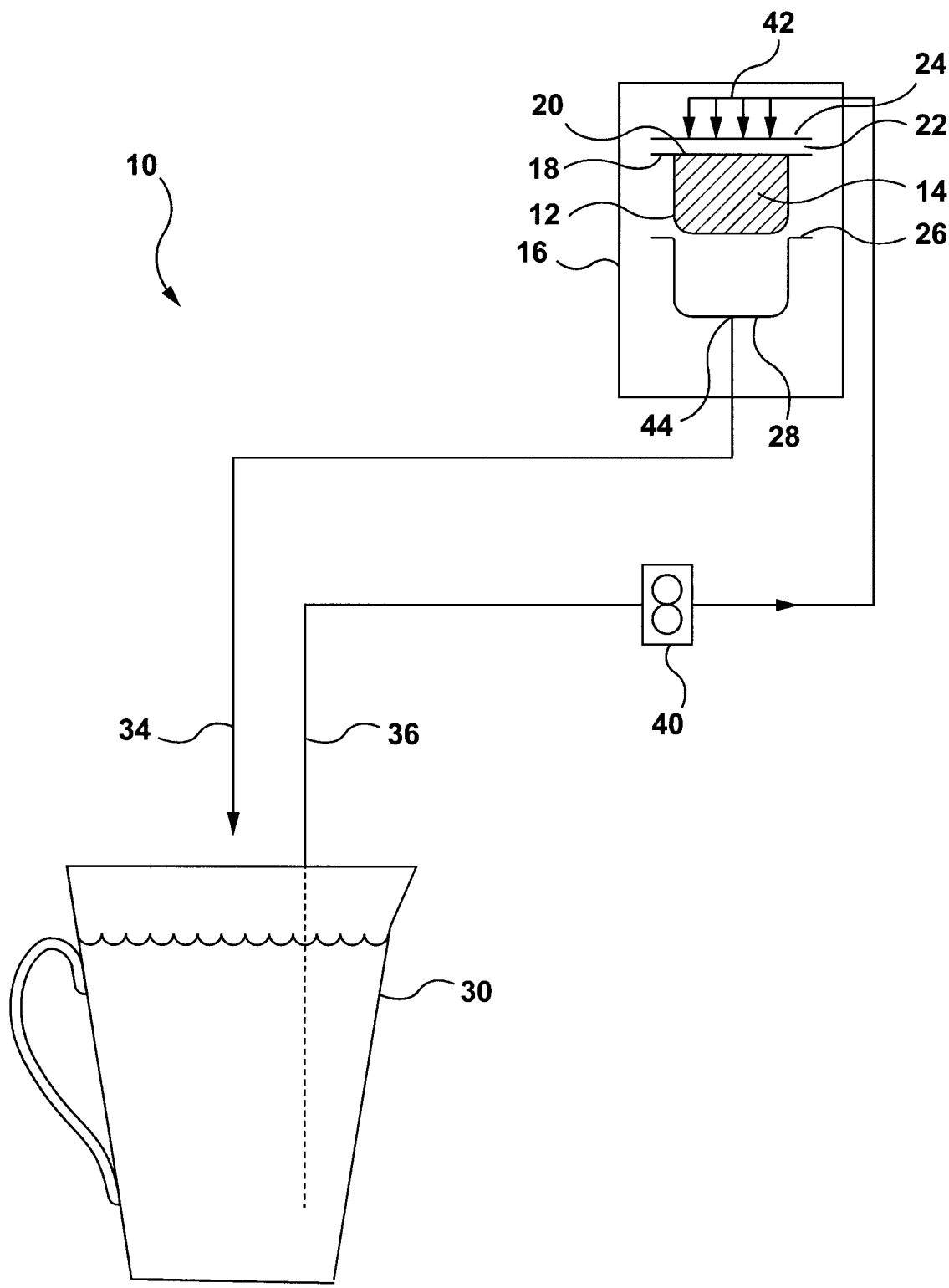
FIG. 1 is a schematic view of a beverage preparation system in accordance with the present invention.

Referring to FIG. 1, a system or machine 10 is shown for use in preparing a beverage such as cold-brew coffee from a pod or portion pack 12 of infusible materials 14 such as roast & ground coffee.

During use, a user removes pod 12 from a foil overwrap (not shown) and places it in a brew chamber 16 of machine 10 and closes brew chamber 16. Pod 12 includes a seam 18 around a top perimeter 20 of pod 12 that is captured between a gasket 22 on a first portion 24 of brew chamber 16 and a rim 26 of a second portion 28 of brew chamber 16. This helps to reduce channeling of fluid around pod 12 and direct more of the flow through infusible materials 14, leading to a more even extraction.

The user then measures a desired volume of cold or ambient temperature fluid (typically water) into a jug or receptacle 30 and places jug 30 under a dispense tube 34 on machine 10. The user then lowers a fluid intake tube 36 into jug 30 and initiates a brewing sequence using a control input (not shown) that communicates with a control system (not shown).

During the brewing sequence, a pump 40 activates for a predetermined or user-selected period of time, recirculating water through inlet tube 36 disposed in jug 30, through an inlet 42 of brew chamber 16, through infusible materials 14, back through an outlet 44 of brew chamber 16 and through dispense tube 34 back into jug 30.

Once the brew sequence is complete, pump 30 deactivates and the cold-brew coffee contained in jug 30 is ready to be consumed.

To rinse machine 10 following use, the user removes the spent coffee pod 12 from brew chamber 16, then closes the brew chamber 16. The user then measures a smaller quantity of water into a container or receptacle 30 such as a drinking glass. The user removes the fluid intake tube 36 from the jug 30 and places it in the drinking glass 30 containing water and initiates the brewing sequence.

Pump 40 activates, drawing water through fluid intake tube 36, pumping it through brew chamber 16 and out dispensing tube 34, pushing residual product from the brewer into jug 30. Alternatively, the fluid intake tube 36 and the dispensing tube 34 may be positioned to allow water to be drawn from one jug 30 and dispensed into a second jug 30 (not shown). As soon as the user sees water dispensing from the dispense spout 34, they stop the brewing sequence. Alternatively, the user may select a rinse sequence which has a shorter pre-determined time duration than the brewing sequence.

Following the rinse sequence, the user may initiate a cleaning sequence by inserting a cleaning puck or pod (not shown) into brew chamber 16 and closes brew chamber 16.

The user then measures a desired volume of water at a desired temperature into an empty jug or receptacle 30 and places the jug 30 under dispense spout 34 on machine 10. The user then lowers fluid intake tube 36 into jug 30 and initiates a brewing or cleaning sequence.

Pump activates, recirculating water from jug 30, through brew chamber 16 and back into jug 30 for a predetermined period of time. This dissolves the cleaning chemicals in the cleaning puck or pod into the water and creates a cleaning fluid that recirculates through machine 10, cleaning and sanitizing all internal wetted parts. The user then completes the cleaning sequence, discards the fluid in the jug 30, then cleans all external parts using a clean damp cloth. Following the cleaning sequence, the user may opt to initiate a rinse sequence as described above, to remove residual cleaning chemicals from the machine 10.

Figure 2:
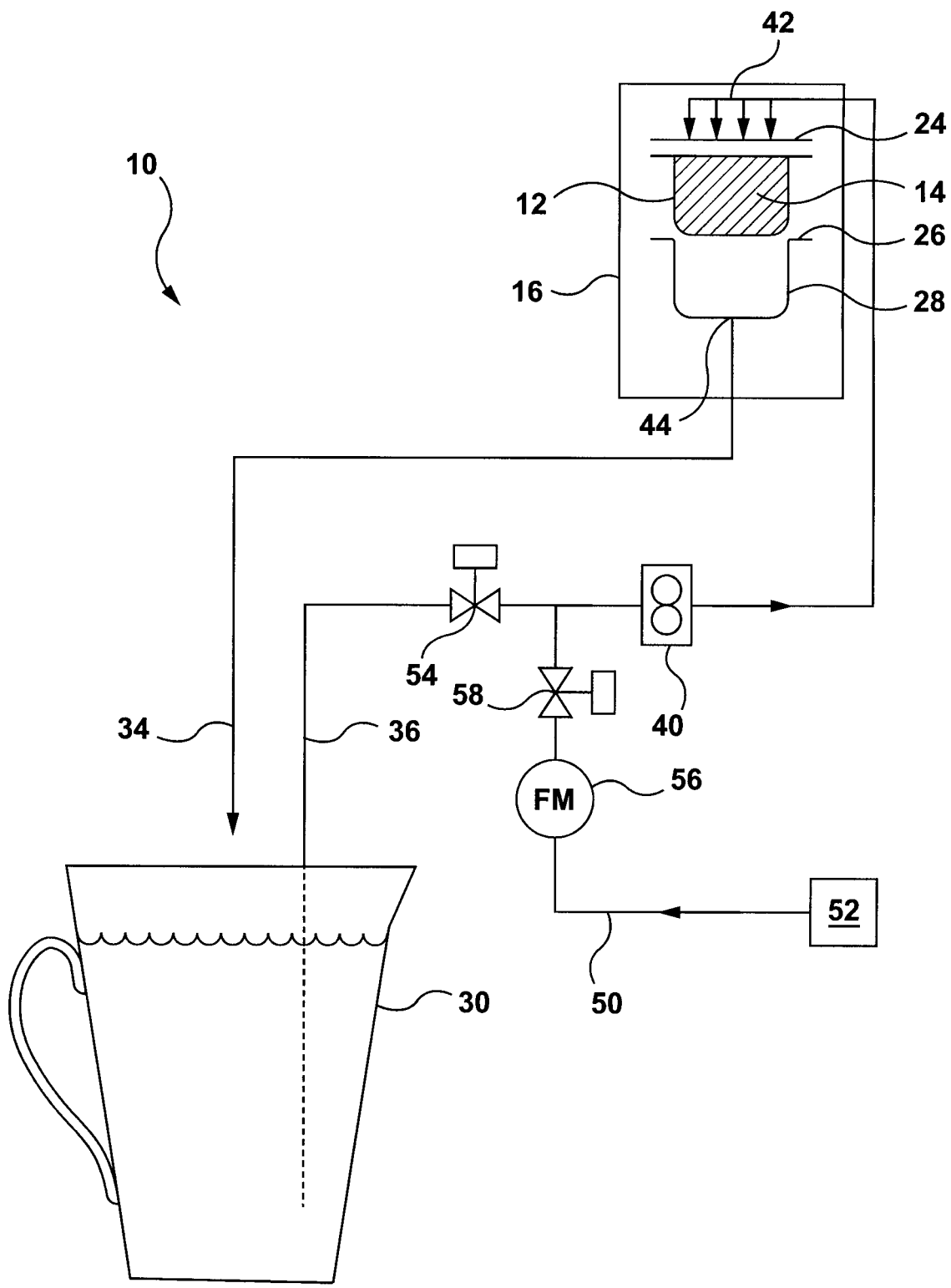
FIG. 2 is schematic view of a beverage preparation system in accordance with another embodiment of the present invention.

Referring to FIG. 2, another embodiment of system or machine 10 for preparing a beverage from a pod 12 is shown. The same reference numerals are used to refer to similar elements in the earlier described embodiment.

The embodiment depicted in FIG. 2 is similar to that shown in FIG. 1, except that machine 10 is equipped with a water inlet 50 which is connected to a water supply 52. Water supply may be filtered and/or pressure-regulated and water inlet 50 may be equipped with a flow restrictor (not shown) to limit water flow. The volume of water used may be controlled manually, by timer or by using a flow sensor such as a flowmeter 56 to measure a pre-determined volume.

During use, a user removes a coffee pod 12 from the foil overwrap (not shown), places it in brew chamber 16 and closes brew chamber 16. The user then places an empty jug or receptacle 30 under a dispense spout 34 on the machine and lowers a fluid intake tube 36 into the jug 30 and initiates the brewing sequence.

During brewing, a water inlet valve 58 opens and pump 40 activates, delivering water through brew chamber 16 and into jug 30 until a predetermined volume of water is measured by flowmeter 56 disposed in water inlet 50 located upstream from water inlet valve 56. Water inlet valve 58 closes and fluid intake valve 54 opens. Pump 40 continues to run for a predetermined or user-selected period of time, recirculating water from jug 30, through brew chamber 16 and back into jug 30. Once the brew sequence is complete, pump 40 deactivates.

To rinse machine 10, the user removes the spent coffee pod 12 from brew chamber 16, then closes the brew chamber 16 and initiates the rinse sequence.

During the rinse sequence, water inlet valve 58 opens and pump 40 activates, delivering water through brew chamber 16 and into jug 30 until a predetermined volume of water is measured by flowmeter 56. This volume is sufficient to ensure product is flushed from pump 40, brew chamber 16 into jug 30. Once the rinse sequence is complete, pump 40 deactivates and fluid intake valve 54 opens, allowing water to flow from water inlet valve 58, backwards through fluid intake valve 54 and fluid intake tube 36 into jug 30. Fluid intake valve 54 closes once a predetermined volume sufficient to ensure product is flushed from these areas into jug 30 is reached, as measured by flowmeter 56.

Following the rinse sequence, the user may initiate a cleaning sequence by inserting a cleaning puck or pod into brew chamber 16 and closes brew chamber 16. The user then places an empty jug 30 under dispense tube 34 on machine 10 and lowers fluid intake tube 36 into jug 30 and initiates the cleaning sequence.

Water inlet valve 58 opens and pump 40 activates, delivering water through brew chamber 16 and into jug 30 until a predetermined volume of water is measured by flowmeter 56. This dissolves the cleaning chemicals from the cleaning puck or pod into the water and creates a cleaning fluid that can be recirculated through machine 10, cleaning and sanitizing all internal wetted parts. Water inlet valve 58 closes and fluid intake valve 54 opens. Pump 40 continues to run for a predetermined period of time, recirculating water from jug 30, through brew chamber 16 and back into jug 30. Machine 10 automatically completes a rinse sequence, flushing all cleaning solution from machine 10 into jug 30. The fluid in jug 30 is then disposed.

Figure 3:
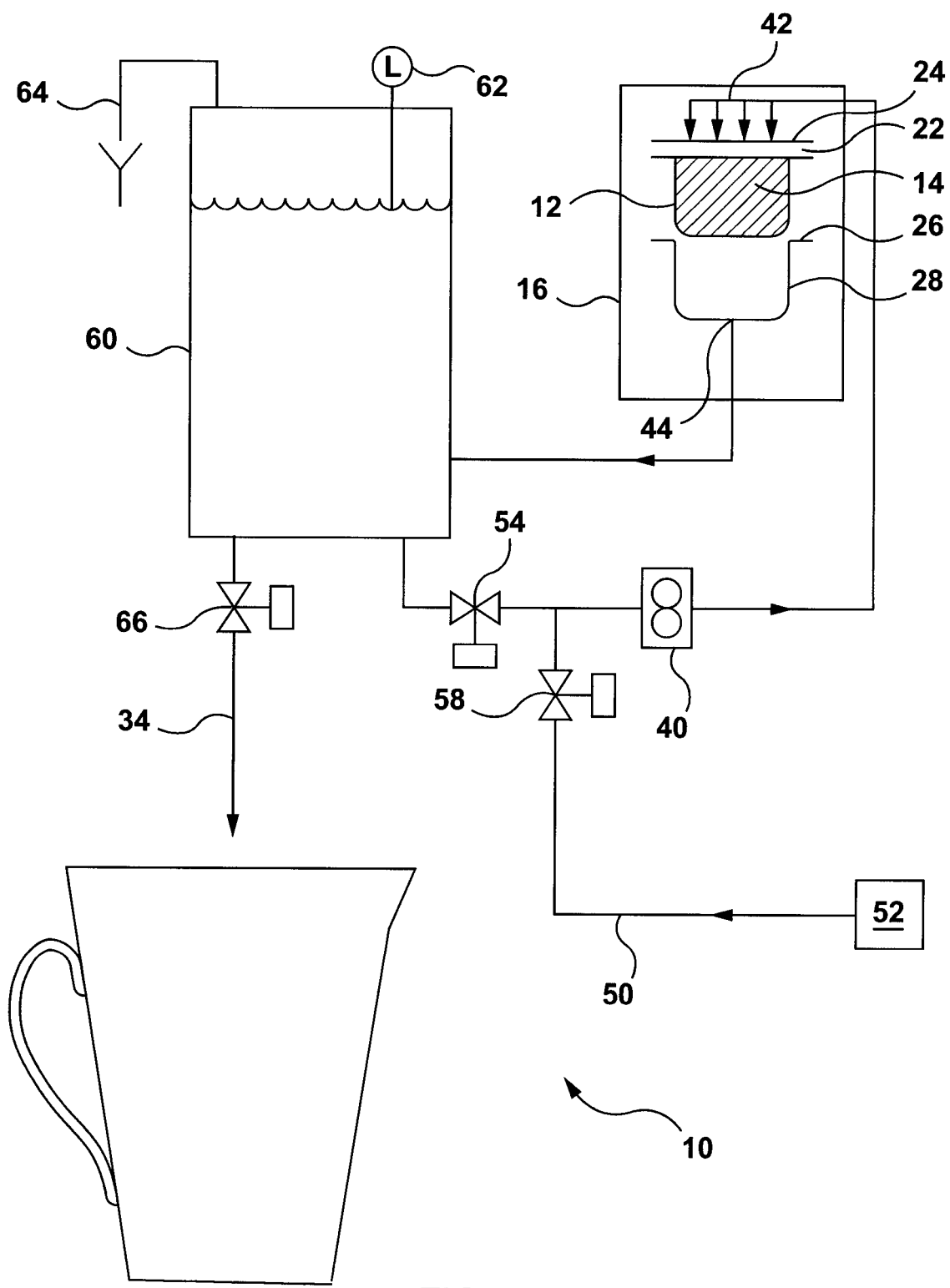
FIG. 3 is schematic view of a beverage preparation system in accordance with another embodiment of the present invention.

Referring to FIG. 3, another embodiment of system or machine 10 for preparing a beverage from a pod 12 is shown. The same reference numerals are used to refer to similar elements in the earlier described embodiments.

This embodiment is similar to that shown in FIG. 2, except that machine 10 is equipped with an internal tank 60, allowing all recirculation to take place within the body of machine 10 and thus eliminating the need for fluid intake tube 36.

Tank 60 includes a level sensor 62, for sensing the level of fluid in tank 60, as well as an overflow line 64 for allowing excess fluid to flow safely away from tank 60. Tank 60 further includes a dispense valve 66 for controlling the dispensing of product through dispense tube 34 into receptacle 30.

Figure 4:
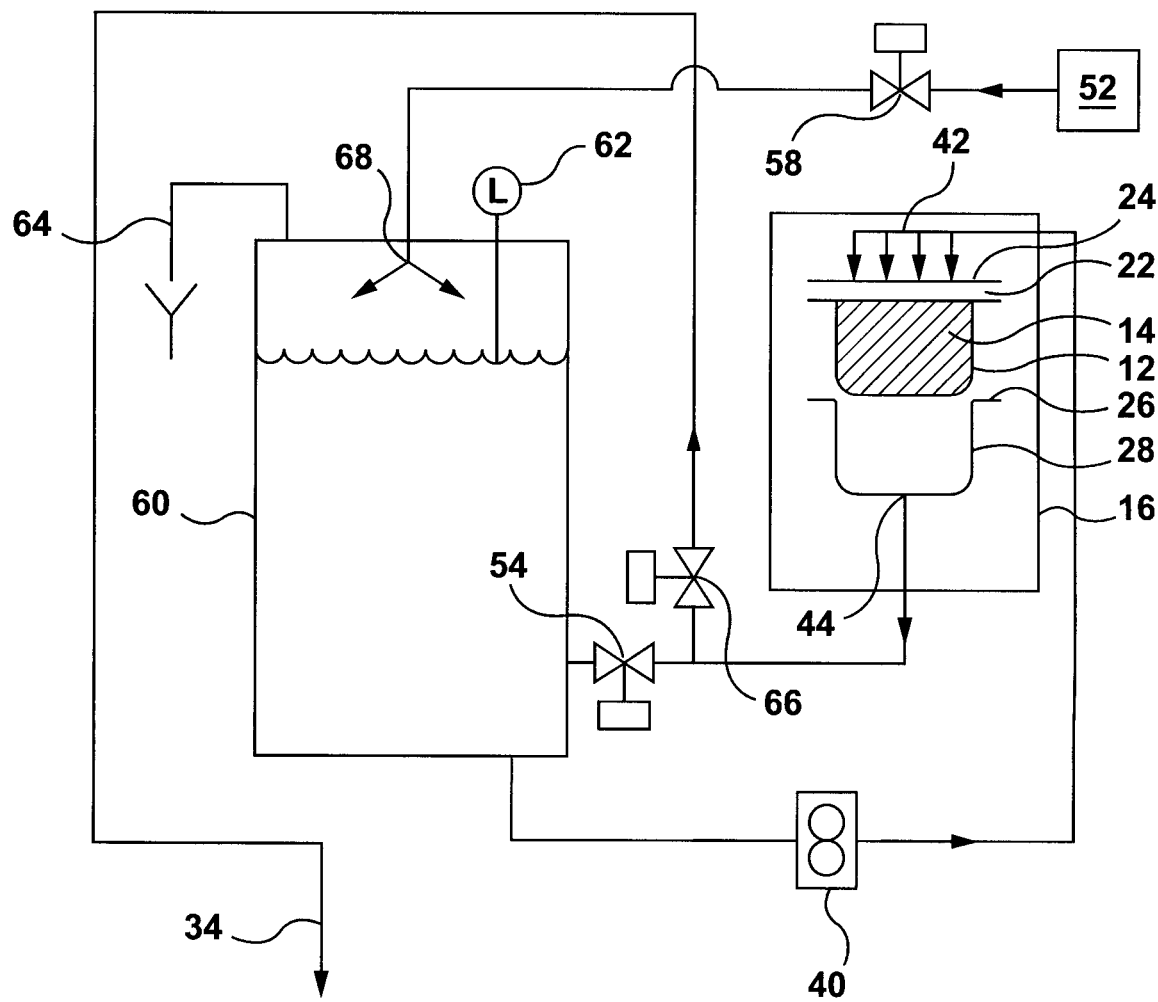
FIG. 4 is schematic view of a beverage preparation system in accordance with another embodiment of the present invention.
Figure 4:
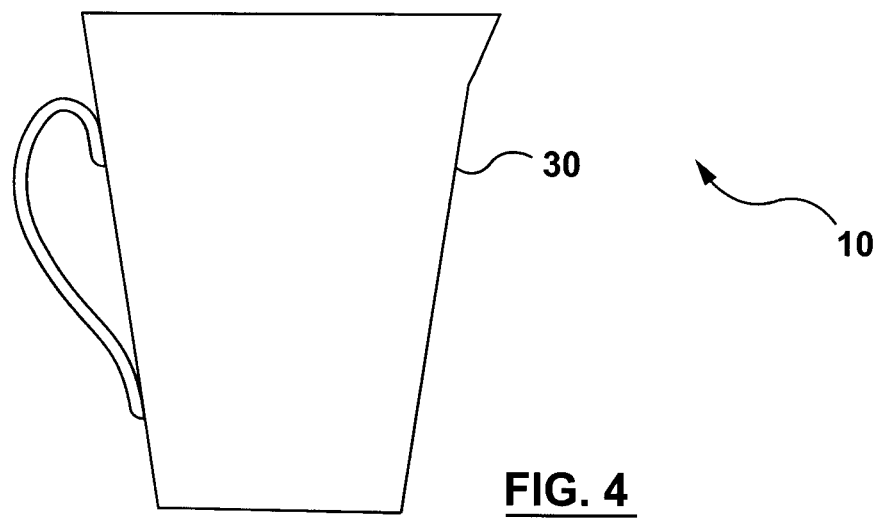

Referring to FIG. 4, another embodiment of system or machine 10 for preparing a beverage from a pod 12 is shown. The same reference numerals are used to refer to similar elements in the earlier described embodiments.

This embodiment is similar to that shown in FIG. 3, except that water inlet line 50 is plumbed to a spray nozzle 68 in tank 60 and dispense valve 66 is relocated from the bottom of the tank 60 to the outlet 66 of the brew chamber 16. This configuration improves the efficiency of the rinse sequence and also allows machine 10 to be built more compactly, as tank 60 no longer needs to be located above the height of jug 30.

Figure 5:
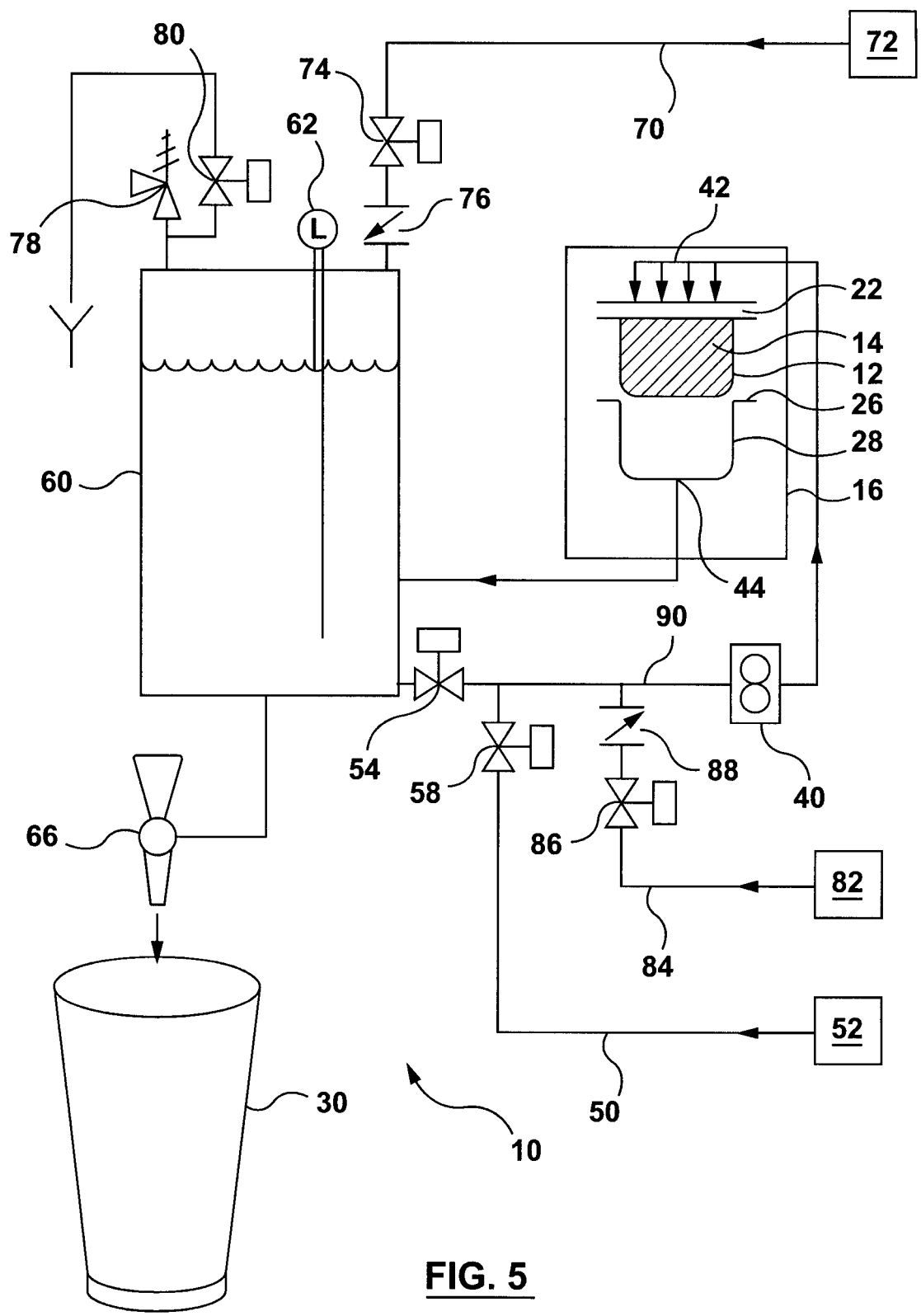
FIG. 5 is schematic view of a beverage preparation system in accordance with another embodiment of the present invention.

Referring to FIG. 5, another embodiment of system or machine 10 for preparing a beverage from a pod 12 is shown. The same reference numerals are used to refer to similar elements in the earlier described embodiments.

This embodiment is similar to that shown in FIG. 3, except that tank 60 is pressurized with nitrogen received through a nitrogen inlet 70 from a nitrogen tank 72 or other nitrogen supply source. The pressurized nitrogen passes through a pressurization valve 74 and check valve 76 into tank 60. Tank 60 is equipped with a pressure-relief valve 78 and a depressurization valve 80.

A second higher-pressure nitrogen supply 82 is introduced through a second nitrogen inlet 84 and a nitrogen supply valve 86 into a pump intake line 90, allowing nitrogen to be dissolved into the product. Dispense valve 66 is replaced by a dispense tap 66 designed for use with pressurized nitro coffee. The incoming water supply 52 is also chilled through an ice bank (not shown) and tank 60 is held at near-freezing temperature in an insulated, refrigerated chamber (not shown).

This configuration allows the preparation of a quantity of nitro cold brew coffee, which is then held refrigerated and under pressure so that it can be dispensed by the serving on demand.

Figure 6:
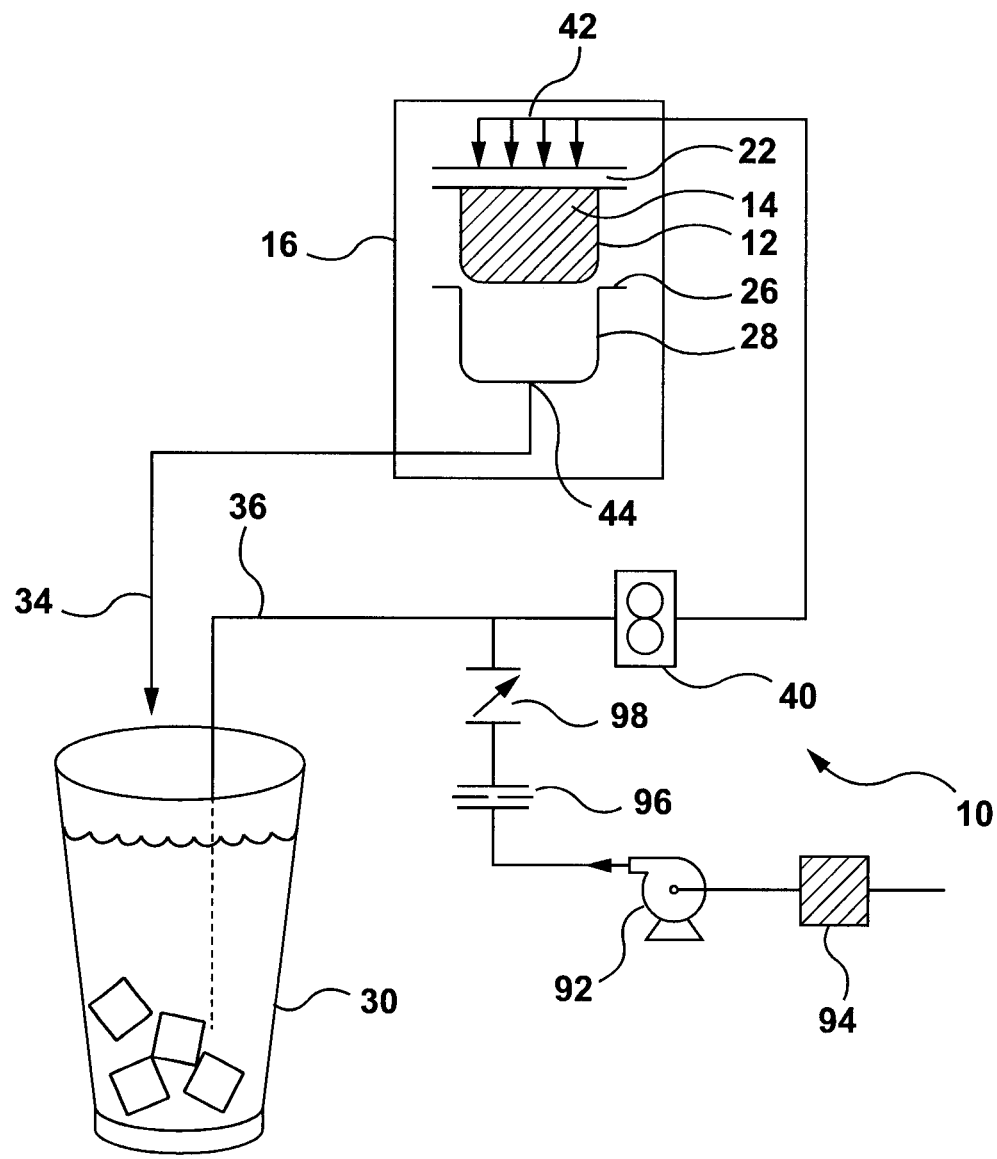
FIG. 6 is schematic view of a beverage preparation system in accordance with another embodiment of the present invention.

Referring to FIG. 6, another embodiment of system or machine 10 for preparing a beverage from a pod 12 is shown. The same reference numerals are used to refer to similar elements in the earlier described embodiments.

This configuration can also be used to create a single serving of nitro cold brew coffee from a pod 12. Rather than using pure nitrogen, this configuration dissolves air (~79% nitrogen) into the coffee under pressure instead. This greatly simplifies the machine and eliminates the need for a supply of nitrogen. Since the product is intended to be consumed immediately after brewing, the impact of added oxygen on flavor is minimal.

Machine 10 includes an air pump 92 that draws air through an air filter 94 from an air source such as the atmosphere surrounding machine 10. The air passes through a flow restrictor 96 and check valve 98 before being introduced to fluid intake tube 36 upstream from fluid pump 40. Machine 10 then recirculates fluid or beverage product, such as coffee, through brew chamber 16 for a desired period of time to produce a desired nitrogen infused beverage product.

Figure 7:
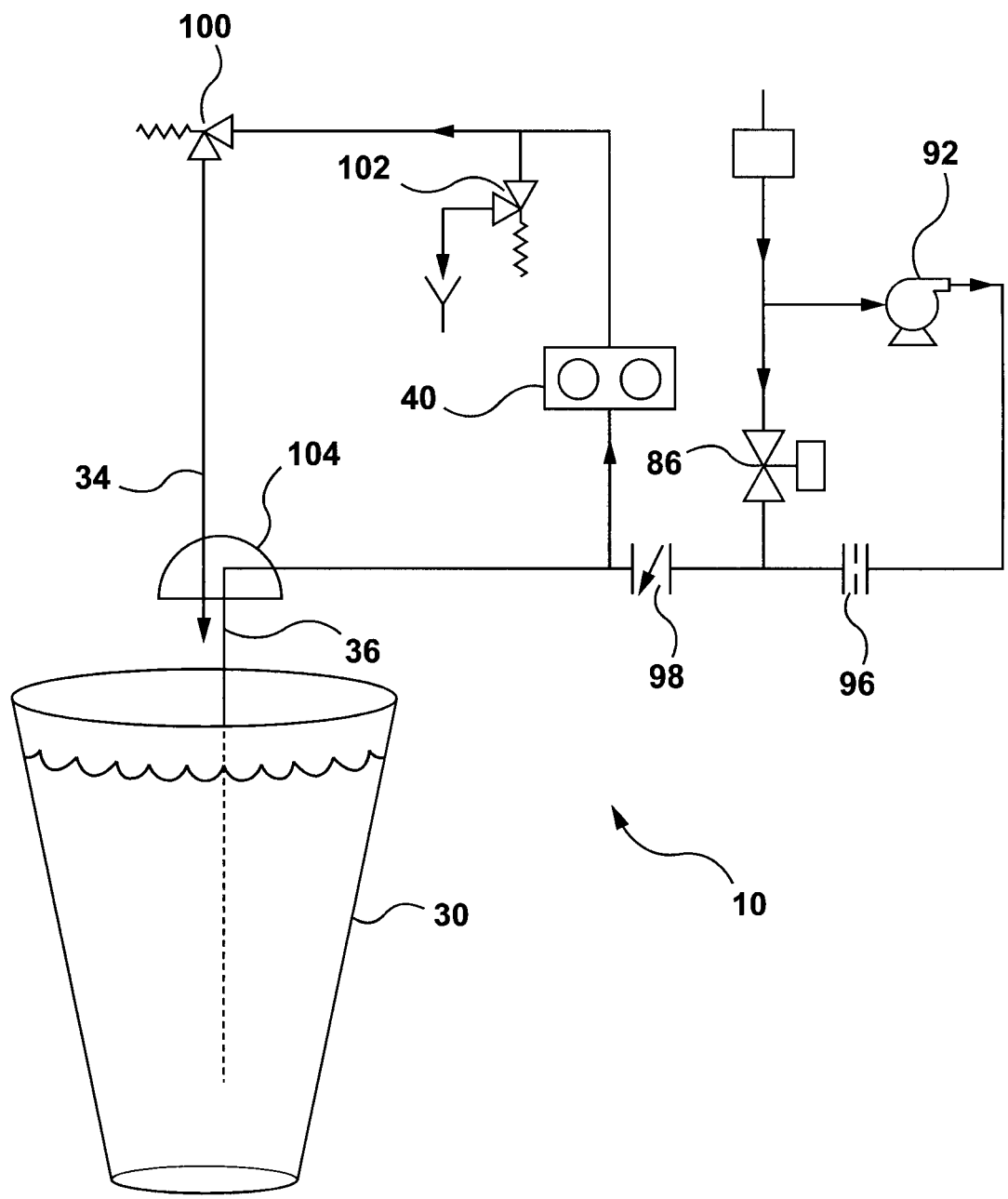
FIG. 7 is schematic view of a beverage preparation system in accordance with another embodiment of the present invention.

Referring to FIG. 7, another embodiment of system or machine 10 for preparing a beverage from a pod 12 is shown. The same reference numerals are used to refer to similar elements in the earlier described embodiments.

Machine 10 include means of introducing air, nitrogen or other gas/gasses to a fluid. The gas is introduced prior to a pump inlet, so that the pressure and shear forces encountered in the pump 40 will speed up the dissolving of these gasses into the fluid or product. Machine 10 may be configured as a stand-alone machine, or as a component of another machine, such as an iced coffee brewer, iced tea brewer or cold brewing machine. In this embodiment, the example used is to add air to cold-brew coffee in order to make "nitro cold brew" coffee.

Machine 10 includes a high-pressure fluid pump 40 capable of pumping 3-5 ounces of fluid per second (5.4-9.0 litres per minute) at a pressure of 10-15 atm. Pump 40 is also able to pump air at a similar rate, and is rated for dry operation. It is of sanitary construction appropriate for clean-in-place sanitizing in a beverage application.

Machine 10 further includes a backpressure valve 100 set to maintain a backpressure of 15 atm at a flowrate of up to 9 LPM of cold coffee. It is resistant to blockage, opening up to allow passage of any materials that enter the inlet, such as coffee grinds from a damaged coffee pod. It does not close bubble-tight, allowing pressure to bleed out of the system in no more than 5 seconds after pump stops. Machine 10 further includes a safety relief valve 102 set to 20 atm, which drains to a drip tray (not shown). Machine 10 further includes an air pump 92 sized to operate in conjunction with a flow restrictor 96 to deliver 10-15 standard mL/second of air into the inlet of the fluid pump 40.

During use, a user fills a plastic cup or receptacle 30 (that is preferably clear for best visual effects) with cold-brew coffee from a pitcher (no ice). The user positions the cup such that fluid intake tube 36 reaches to the bottom of the cup 30, then press a control button (not shown) to activate the nitro sequence. Fluid intake tube 36 may be combined with dispense tube 34 into a dual function element or wand referred to herein as a nitro wand 104.

During the nitro sequence, product pump 40 and air pump 92 activate simultaneously for a desired time period (such as 5 seconds). During this time, coffee is drawn up the nitro wand 104, a small amount of air is injected into the coffee, and this coffee/air mixture is pumped back to the cup 30. The high pressure and turbulence developed through the pump 40 and backpressure valve 100 rapidly infuses the air into the coffee. Pumps 40 and 92 remain on and air valve (not shown) opens for a desired time period (such as 2 seconds). Product pump 40 then pumps air through dispense tube 34 of nitro wand 104 and nitrogen infused product drains back to the cup 30 through gravity after which pumps 40 and 92 stop and air valve closes.

At the end of the nitro sequence, the cold brew coffee is transformed into nitro cold brew. The resulting beverage product includes a dramatic cascade of bubbles preferably lasting at least 90 seconds and producing a creamy head of foam that is preferably ⅜" to ½" thick. Machine 10 with nitro wand 104 can also be used to create a nitro iced tea or nitro latte (using a blend of milk and concentrated cold brew coffee).

Figure 8A:
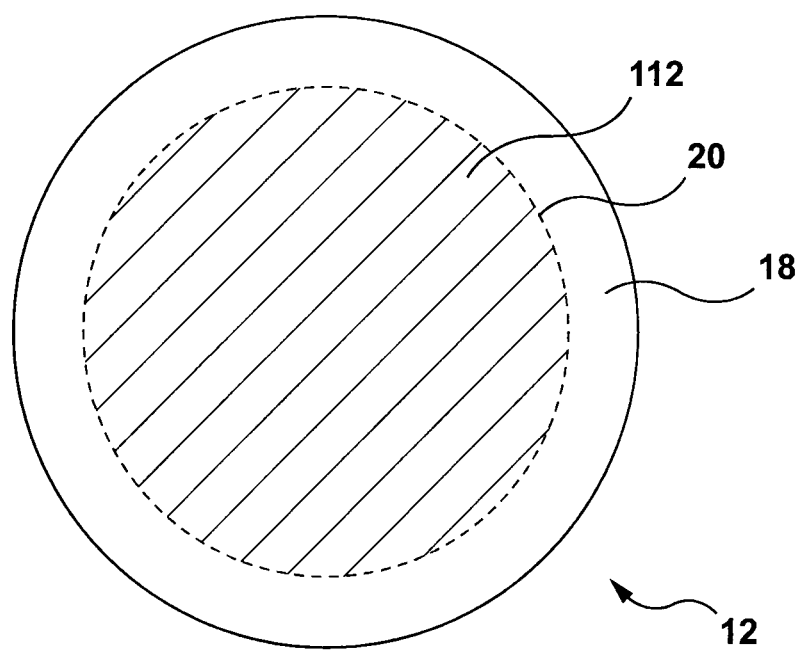
FIG. 8A is top view of a pod for use in a beverage preparation system of the present invention.
Figure 8B:
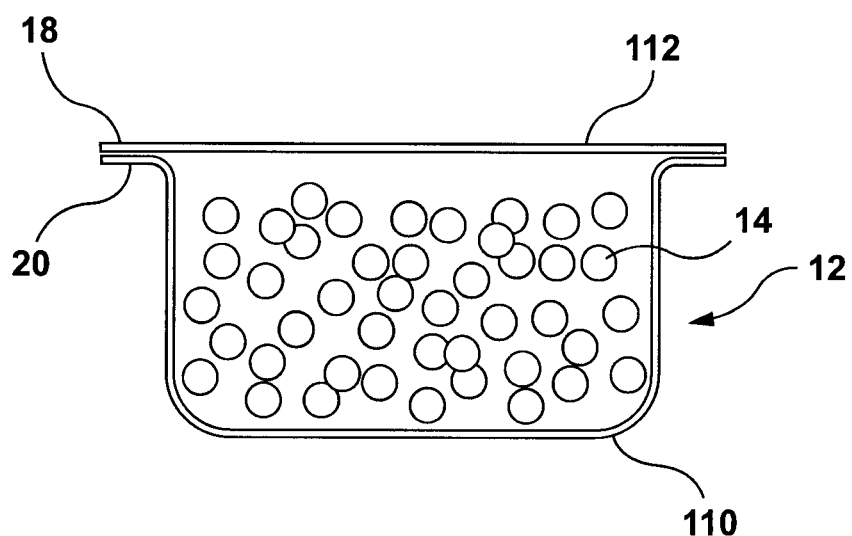
FIG. 8B is sectional side view of a pod for use in a beverage preparation system of the present invention.

Referring to FIGS. 8A and 8B, a pod 12 suitable for use in at least one of the embodiments of machine 30 described above is shown.

Pod 12 includes a first filter material 110 defining a bottom layer of pod 12 that is formed into a pocket to hold infusible materials 14. First filter material 110 is preferably a non-woven synthetic (and preferably biodegradable) material. A thermoforming process is preferably used to simultaneously form the desired shape and to stretch material 110 to increase the permeability of the lower portion. This encourages fluid flow through the infusible material 14 and out through the lower portion of the first filter material 110, thus improving the evenness of extraction. The shape of the first filter material 110 is designed to interface with supporting elements of the brew chamber to improve structural integrity during brewing.

A second filter material 112 defining a top layer of pod 12 is sealed over the opening created by the pocket in the first filter material 110. Second filter material 112 is formed of a similar material as the first filter material 110, except that it may have higher permeability than the first filter material 110, thus encouraging fluid flow into the interior of the pod 12.

A seam zone 18 is defined around the perimeter 20 of the pod 12, where the first filter material 110 is sealed to the second filter material 112 to enclose the infusible material 14 within the pod 12. This seam zone 18 is designed to be stiffer than the rest of the filter material 110, 112 in the pod 12, for ease of handling, ease of removal, and to discourage flow through the seam zone 18 and around the outside of the pod 12. The seam zone 18 is designed to be captured between the first portion 24 and second portion 28 of the brew chamber 16, further minimizing the potential for fluid to channel around the pod 12. One or more pods 12 may be packaged in a gas-flushed oxygen-barrier overwrap (not shown) to preserve freshness.

Figure 9A:
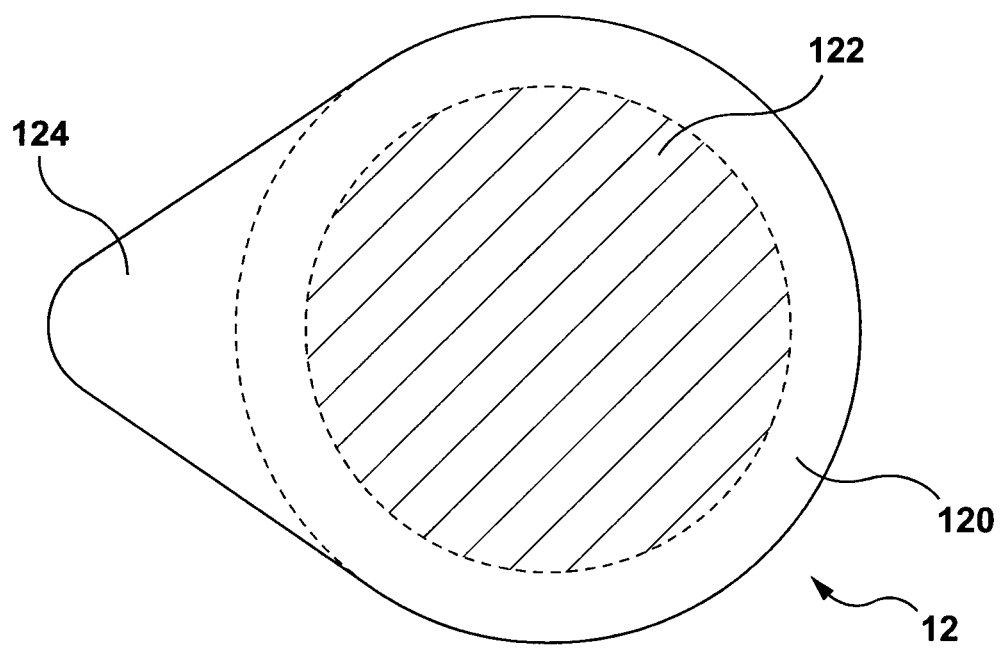
FIG. 9A is top view of a capsule for use in a beverage preparation system of the present invention.
Figure 9B:
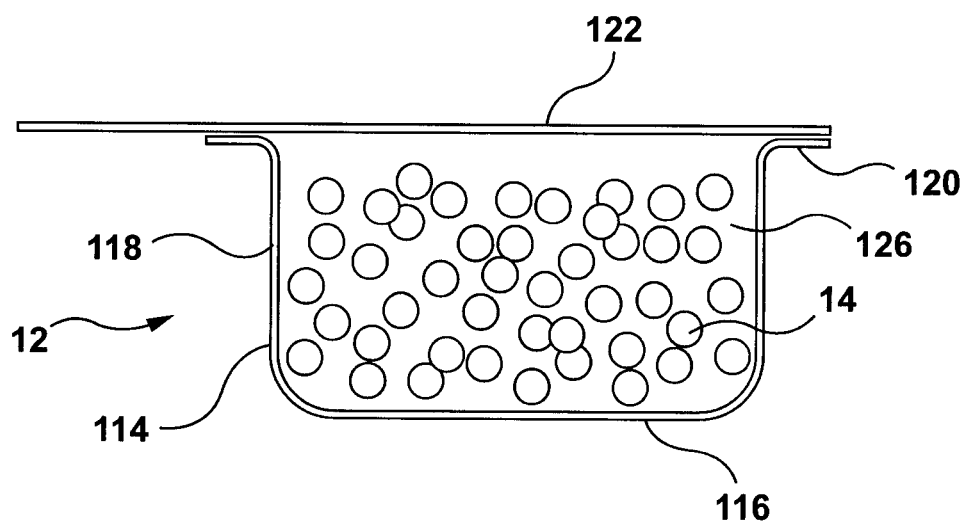
FIG. 9B is sectional side view of a capsule for use in a beverage preparation system of the present invention.

Referring to FIGS. 9A and 9B, a pod or capsule 12 suitable for use in at least one of the embodiments of machine 30 described above is shown. The same reference numerals are used to refer to similar elements in the earlier described embodiments.

Capsule 12 comprises a body portion 114 made of a polymer such as polypropylene, with an EVOH layer to preserve freshness and a layer of PE or other plastic material to improve lid adhesion. The body portion 114 is thermoformed to define a cup shape having a bottom zone 116, a frustoconical sidewall zone 118 and a rim zone 120. It may have a stacking ring (not shown) in the side wall 118, to improve handling of empty capsules 12 prior to filling with infusible materials 14. It may also have structural features such as raised bumps or ridges (not shown) designed to interface with the brew chamber 16, create channels between the capsule 12 and the brew chamber 16, increase structural strength of the capsule 12, or increase flexibility of the capsule 12.

A lid portion 122 is designed to seal to the rim 120 of the body portion 114, closing the opening in the body portion 114 to seal in a portion of infusible material 14. The lid portion 122 may be made of one or more layers of aluminum, EVOH, PE, polypropylene or other plastics and includes an oxygen-barrier layer such as aluminum or EVOH to preserve freshness. The lid portion 122 is provided with a pull tab 124 to aid in the removal of the lid portion 122 after brewing, allowing the spent infusible material 14 to be discarded or composted prior to recycling the body and/or lid portions 114, 122 of the capsule 12.

An interior space 126 is filled with infusible material 14 and gas-flushed to preserve freshness. The lid portion 122 is sealed to the rim zone 120 in a way that ensures packaging integrity and maintains freshness, but still allows for removal or partial removal of the lid portion 122 after brewing.

The bottom zone 116 of the body portion 114 is designed to be pierced by number of outlet probes (not shown) that may be provided in the base of the brew chamber 16, thus forming a filter structure during brewing by the interface of these outlet probes and the pierced bottom zone of the capsule 12. The lid portion 122 of the capsule 12 is designed to be pierced by one or more inlet probes (not shown) in the upper portion of the brew chamber 16, to allow the inflow of fluid into the capsule 12.

Figure 10:
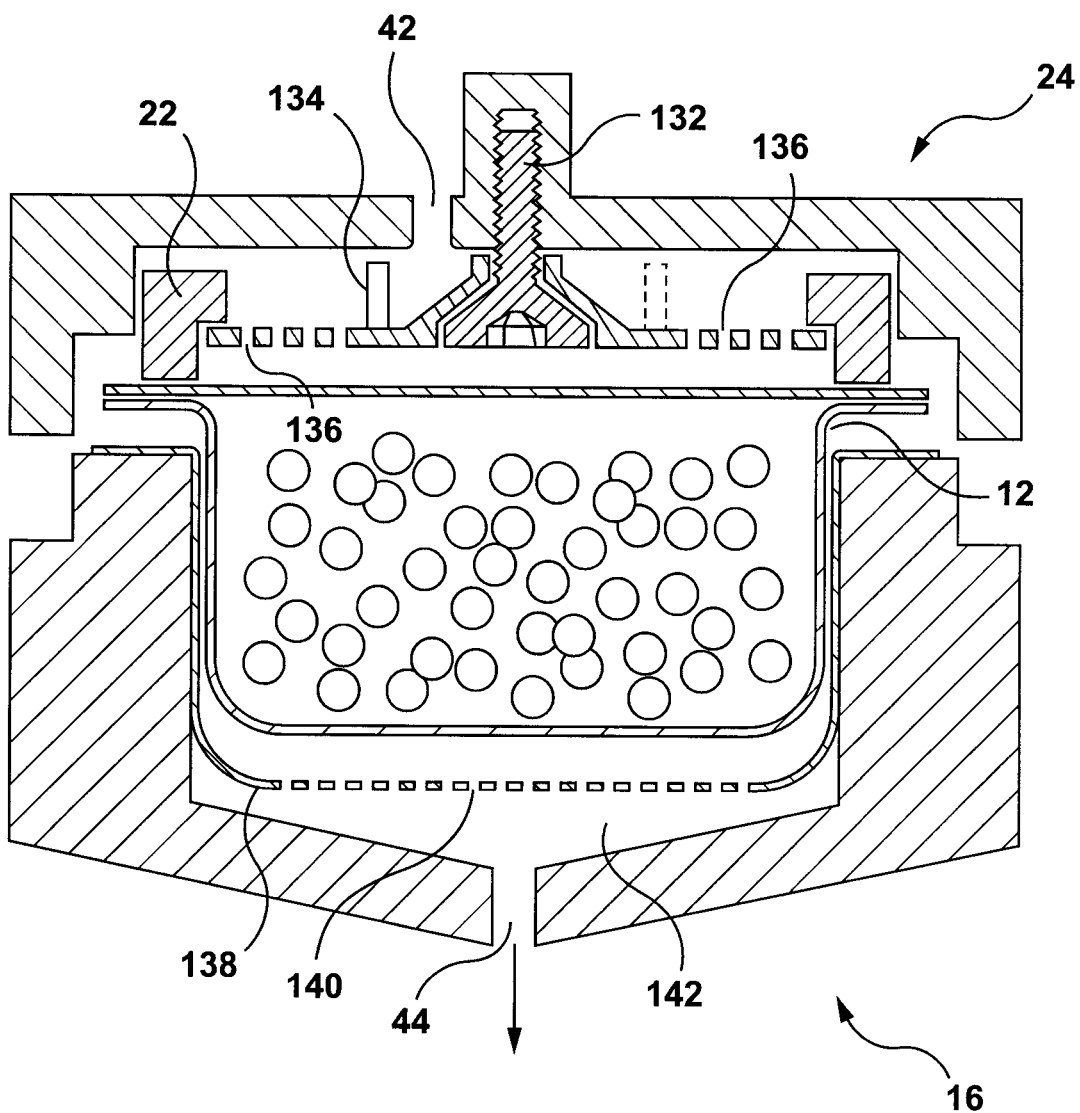
FIG. 10 is a sectional side view of a brew chamber for a beverage preparation system of the present invention.
Figure 11:
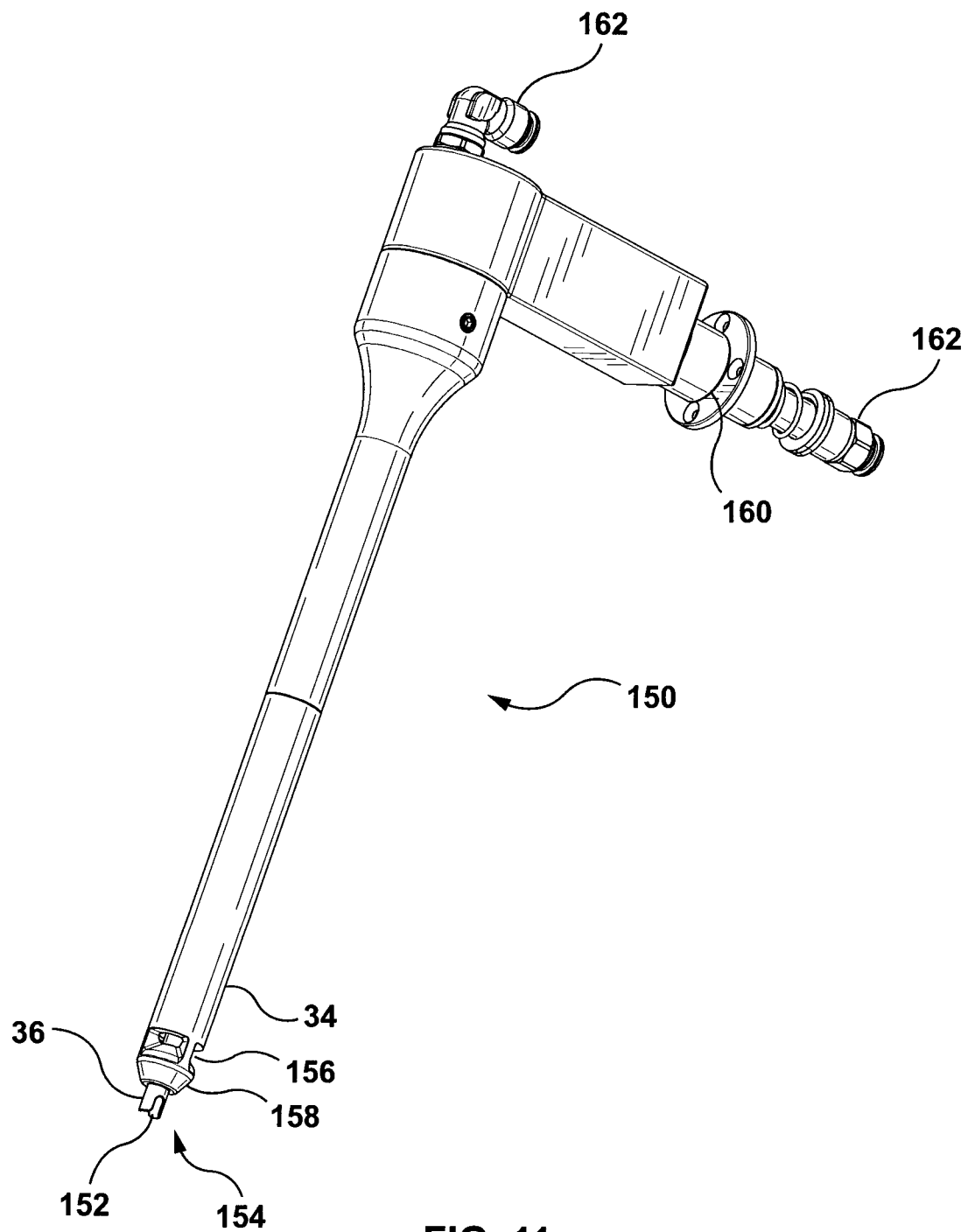
FIG. 11 is a perspective view of a brewing wand in accordance with the present invention.
Figure 12:
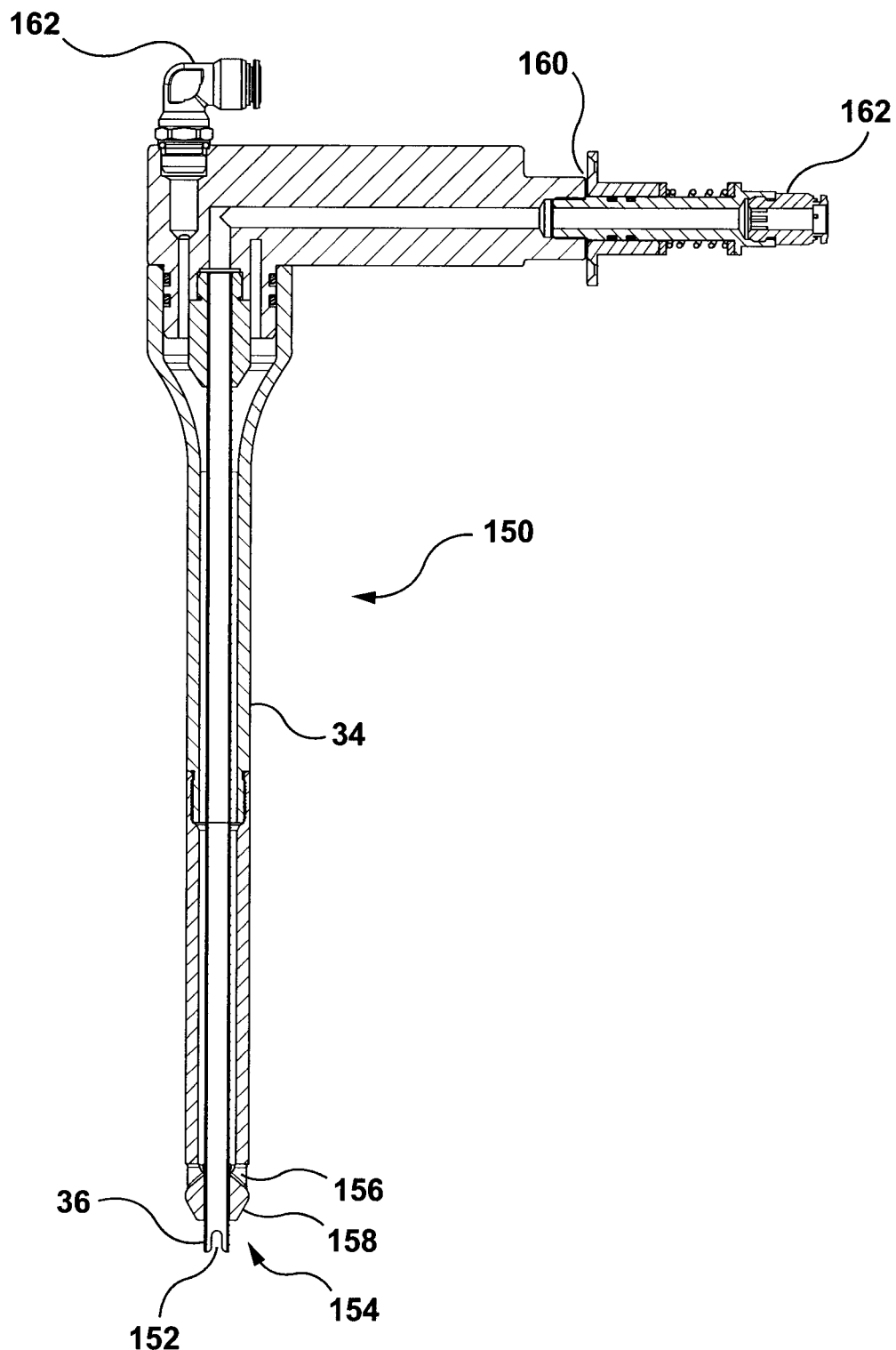
FIG. 12 is a sectional view of the brewing wand of FIG. 11.
Figure 13A:
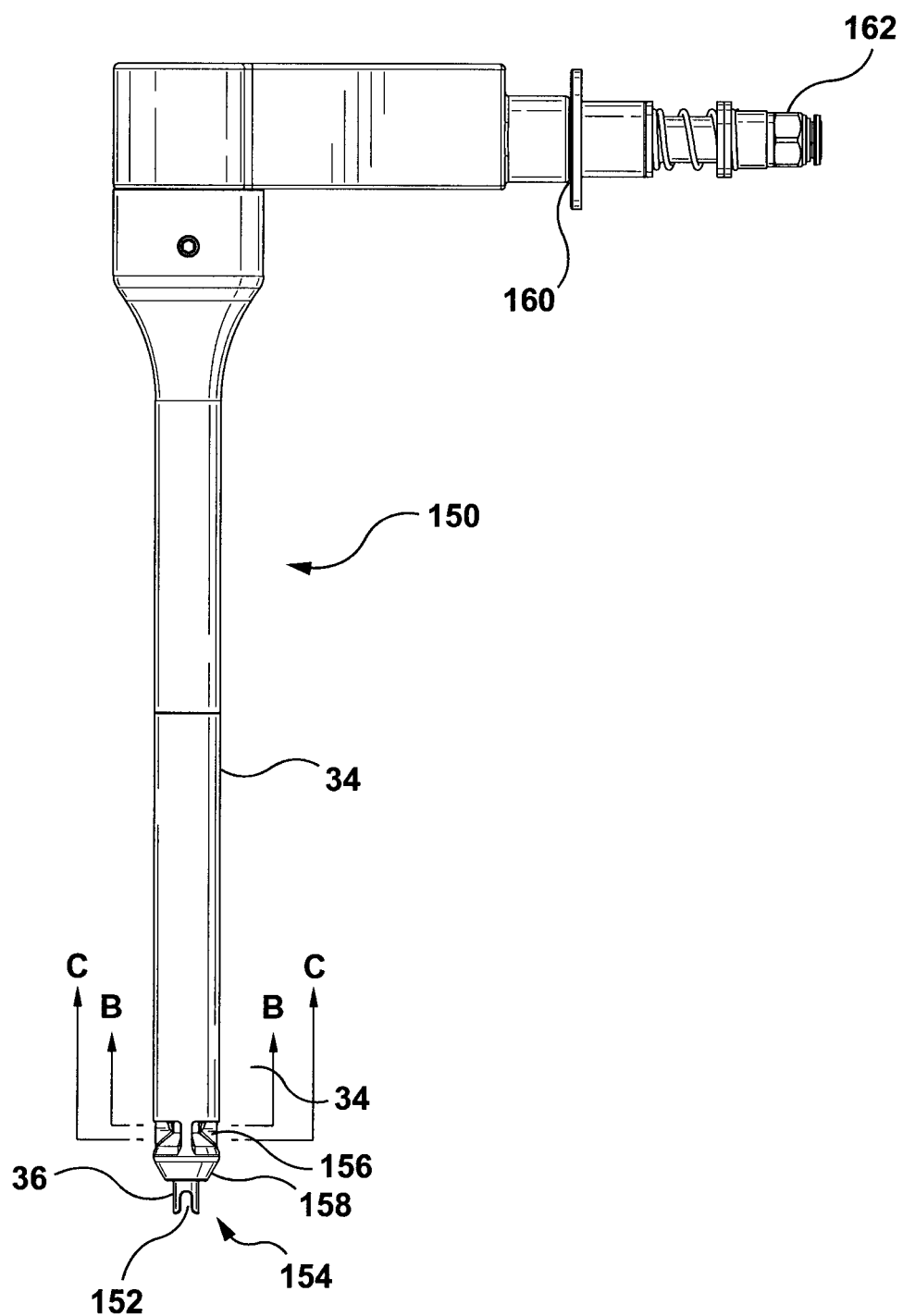
FIG. 13A is a side view of the brewing wand of FIG. 11.
Figure 13B:
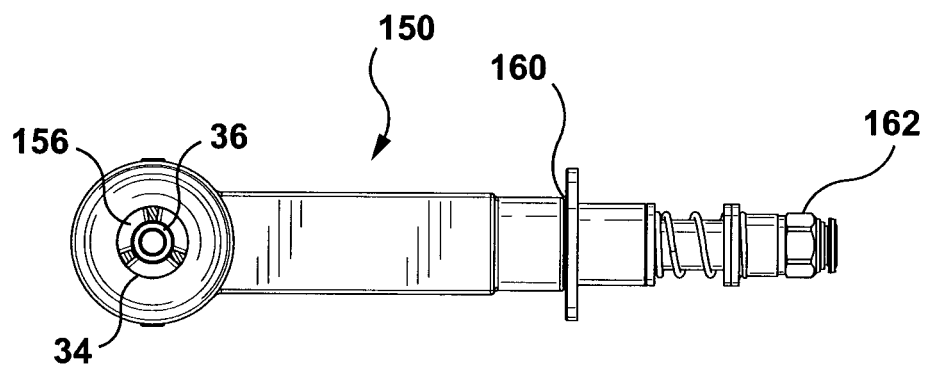
FIG. 13B is a sectional view of the brewing wand of FIG. 11 as viewed along lines B-B of FIG. 13A.
Figure 13C:
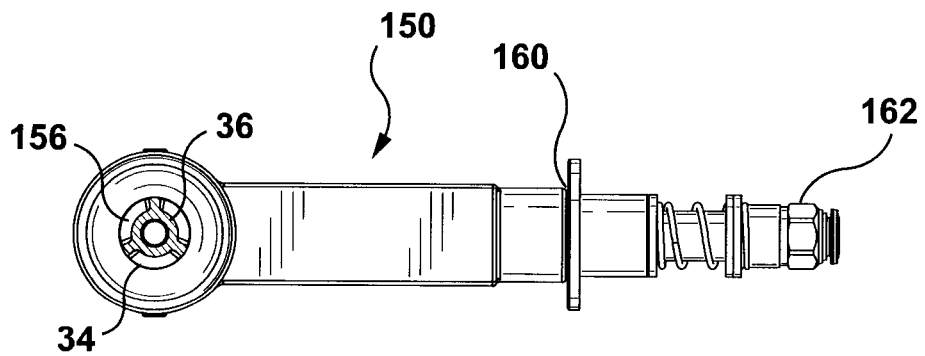
FIG. 13C is a sectional view of the brewing wand of FIG. 11 as viewed along lines C-C of FIG. 13A.

Referring to FIG. 10, a brew chamber 16 is shown suitable for brewing a pod 12 in one of the embodiments of machine 10 as described above. The brew chamber 16 consists of a first (upper) portion 24 and a second (lower) portion 28, constructed so as to be easily opened and closed by a user, and to withstand internal pressures of up to 20 bar.

A first perforated plate 130 is disposed within the first portion 24 of the brew chamber 16, and may be secured with a recessed screw 132 as shown. This first perforated plate 130 includes a jet breaker structure 134 which slows the velocity of fluid entering through the fluid inlet 42 and disperses this fluid evenly over the first perforated plate 130 and perforations 136 to evenly distribute the incoming fluid over the surface of the pod 12, to encourage evenly distributed flow in order to improve the evenness of extraction from the pod 12.

A gasket 22 is held in place by first perforated plate 130. This gasket 22 seals to the first portion 24 of brew chamber 16 to prevent fluid leaks. Gasket 22 also seals to first perforated plate 130 to ensure fluid is forced through the perforations 136 and is not able to bypass around the edge of the first perforated plate 130. Furthermore, gasket 22 seals against the top of the pod 12, ensuring that fluid cannot bypass around the outside of the pod 12. Gasket 22 applies even pressure to the seal zone of the pod 12, sealing it against the second portion 28 of the brew chamber 16 to prevent leaks, and capturing the seal zone of the pod 12 so that it cannot move out of position.

A second perforated plate 138 is disposed within the second portion 28 of the brew chamber 16, secured in place by friction fit, welding in place or other means. The second perforated plate 138 provides support to the bottom of the pod 12, ensuring structural integrity is maintained and encourages evenly distributed fluid flow through the perforations 140 in order to improve the evenness of extraction. Second perforated plate 138 further creates a space 142 at the bottom of brew chamber 16 where the product can easily flow towards the product outlet 44.

The brew chamber 16 may also be equipped with means of ejecting the spent pod following extraction, means to prevent the brew chamber from being opened while under pressure and a sensor to detect whether the brew chamber is closed, to prevent the initiation of machine functions when the brew chamber is not fully closed and/or to provide status feedback to the user.

The brew chamber may be opened and closed manually, using a mechanical mechanism (not shown) with over-center cam and/or latching features to maintain the closed position.

The brew chamber may also be opened and closed automatically using a motor-driven mechanism (not shown).

The brew chamber may be oriented horizontally or on an angle, in order to facilitate pod insertion and, pod removal, pod ejection or brew chamber drainage. This may also simplify machine construction, allow a more compact design or allow a more user-friendly interface.

Referring to FIGS. 11-13A-C, an embodiment of a brewing wand 150 (or dispensing wand) is shown for dispensing product into a receptacle 30 and for drawing product from the same receptacle 30 for recirculation back into a machine 10. The same reference numerals are used to refer to similar elements in the earlier described embodiments.

Brewing wand 150 allows splashing to be minimized and mixing in the receptacle 30 can be optimized through two co-axial flow paths of dispensing tube 34 and intake tube 36. Intake tube 36 extends deepest into receptacle 30. It may include one or more vacuum-break slots 152 in a tip 154, to prevent blocking of intake tube 36 should it contact the base of receptacle 30. Dispensing tube 34 surrounds intake tube 36, creating a co-axial flow path for dispensed product moving in the opposite direction of the product in intake tube 36.

Dispensed product exits through three exit ports 156 defined at the periphery of the end of dispensing tube 34. Exit ports 156 in this embodiment are close to the end of brewing wand 150, allowing machine 10 to operate efficiently when there is only a small amount of product in receptacle 30. Alternatively, exit ports 156 can be located further up brewing wand 150 for improved mixing when brewing with a larger volume in receptacle 30.

A flow control surface 158 is designed to direct laminar flow of dispensed fluid over the outer surface of intake tube 36 and towards the base of receptacle 30 when operating in low-flow conditions during initial filling of receptacle 30. Flow control surface 158 is also designed to direct flow of dispensed liquid radially outwards from brewing wand 150 during high-flow recirculation conditions when there is already liquid in receptacle 30, in order to optimize mixing within receptacle 30.

Brewing wand also includes a hinge element 160 that allows wand 150 to be rotated forwards to facilitate placement and removal of receptacle 30. Brewing wand 150 further includes fluid line connectors 162 for connecting inlet tube 36 and dispensing tube 34 to fluid lines (not shown) for conducting fluid to desired locations of machine 10 including inlet 42 and outlet 44 of brew chamber 16.

Figure 14:
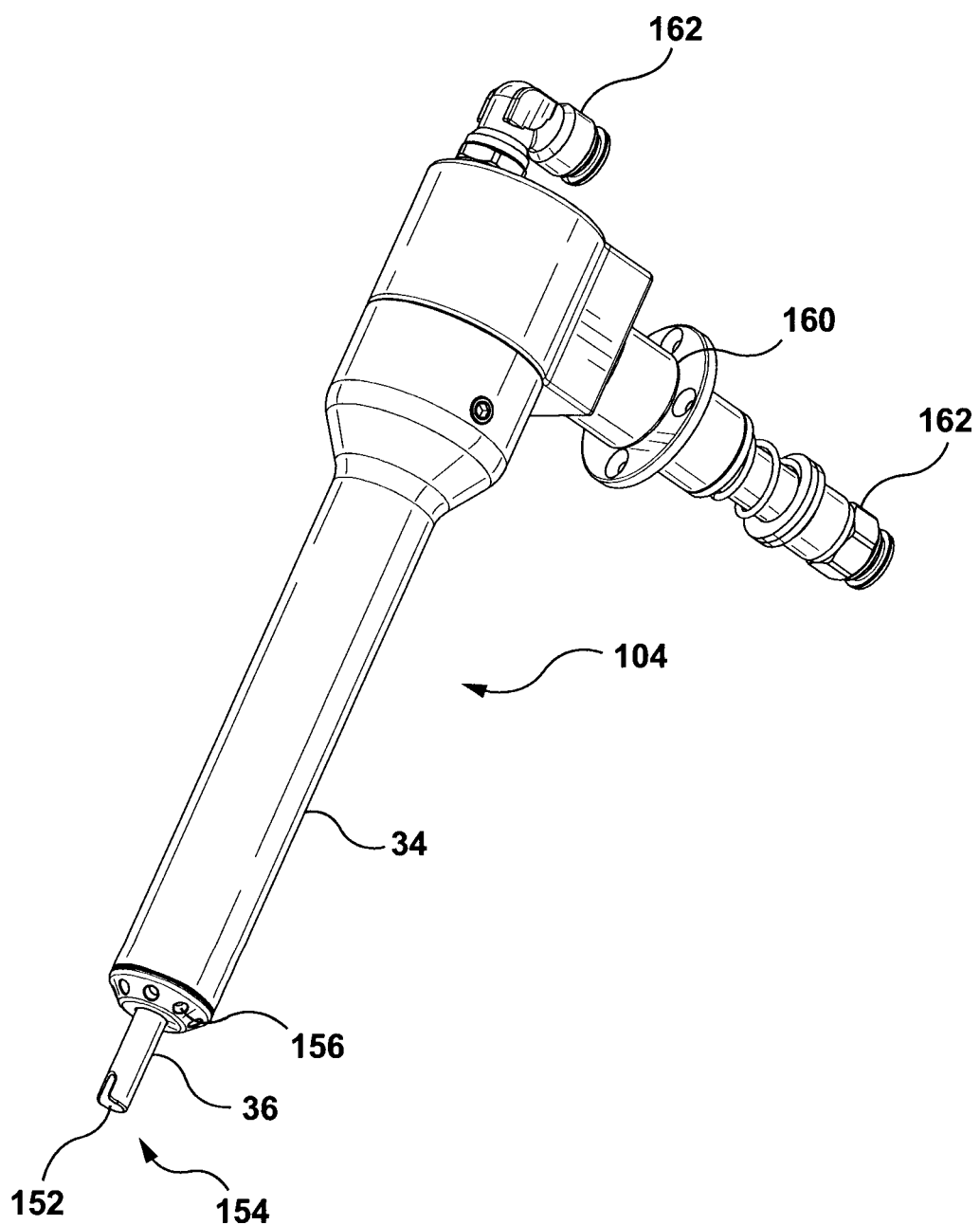
FIG. 14 is a perspective view of a nitro wand in accordance with the present invention.
Figure 15:
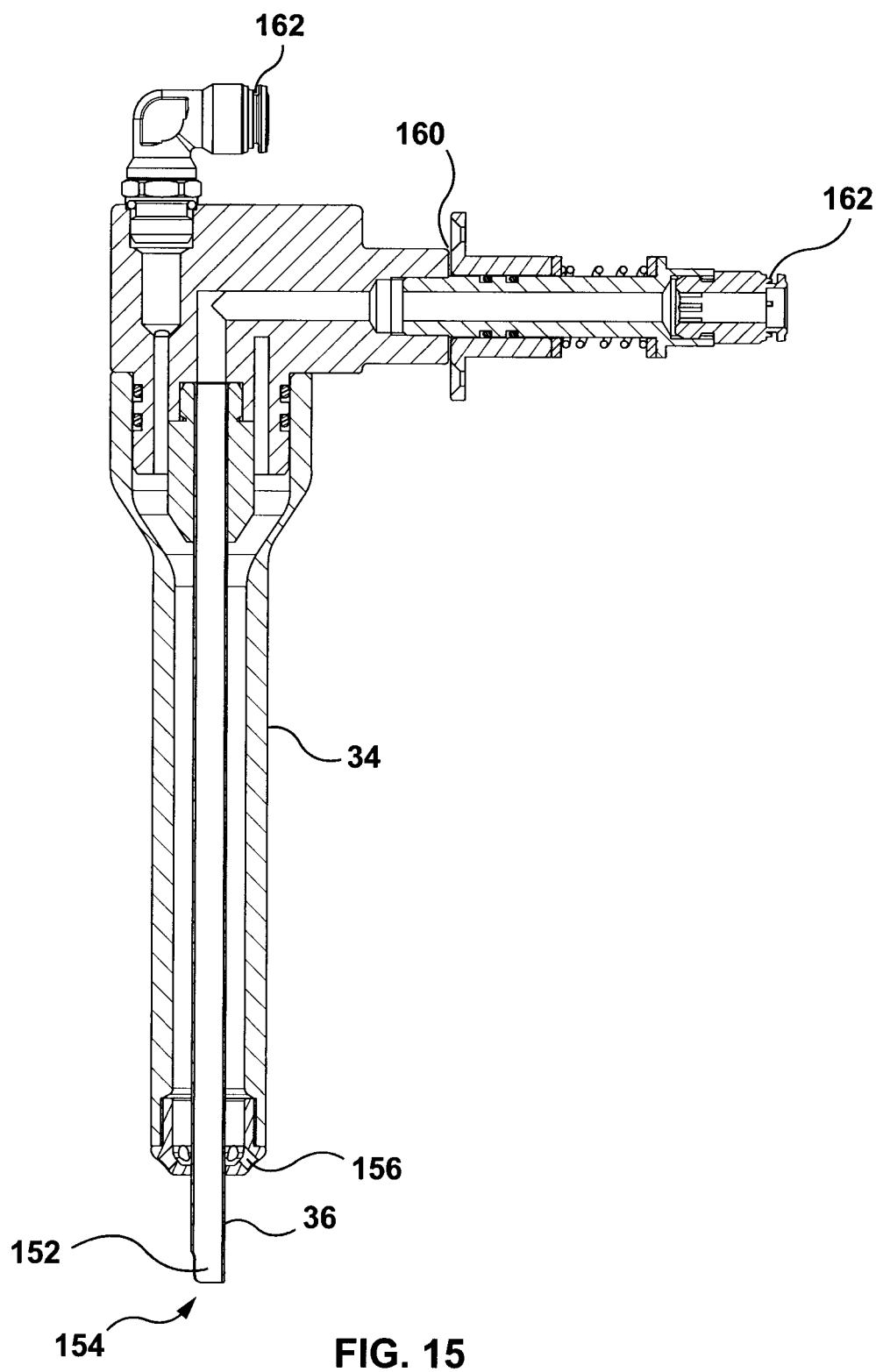
FIG. 15 is a sectional view of the nitro wand of FIG. 14.

Referring to FIGS. 14-15, an embodiment of nitro wand 104 is shown for recirculating fluid from receptacle 30 for the addition of nitrogen or other gasses to the fluid. The same reference numerals are used to refer to similar elements in the earlier described embodiments.

Intake tube 36 extends deepest into receptacle 30. It may include one or more vacuum-break slots 152 in tip 154, to prevent blocking of intake tube 36 should it contact the base of receptacle 30. Dispensing tube 34 surrounds intake tube 36, creating a co-axial flow path for dispensed product moving in the opposite direction of the product in intake tube 36.

Dispensed product exits through multiple exit ports 156 arranged at the periphery of the end of dispensing tube 34. Exit ports 156 direct the flow of dispensed fluid radially outwards from nitro wand 104 in order to optimize mixing within receptacle 30.

Nitro wand 104 also includes a hinge element 160 that allows wand 104 to be rotated forwards to facilitate placement and removal of receptacle 30. Nitro wand 104 further includes fluid line connectors 162 for connecting inlet tube 36 and dispensing tube 34 to fluid lines (not shown) for conducting fluid to desired locations of machine 10.

Referring to FIGS. 16-20, a preferred embodiment of a brew chamber 16 is shown. The same reference numerals are used to refer to similar elements in the earlier described embodiments.

Brew chamber 16 contains a means of automatically adjusting the interior depth of brew chamber 16 after infusible material 14 has been added, as well as a means of automatically ejecting the spent infusible material into a waste receptacle after brewing.

Figure 16:
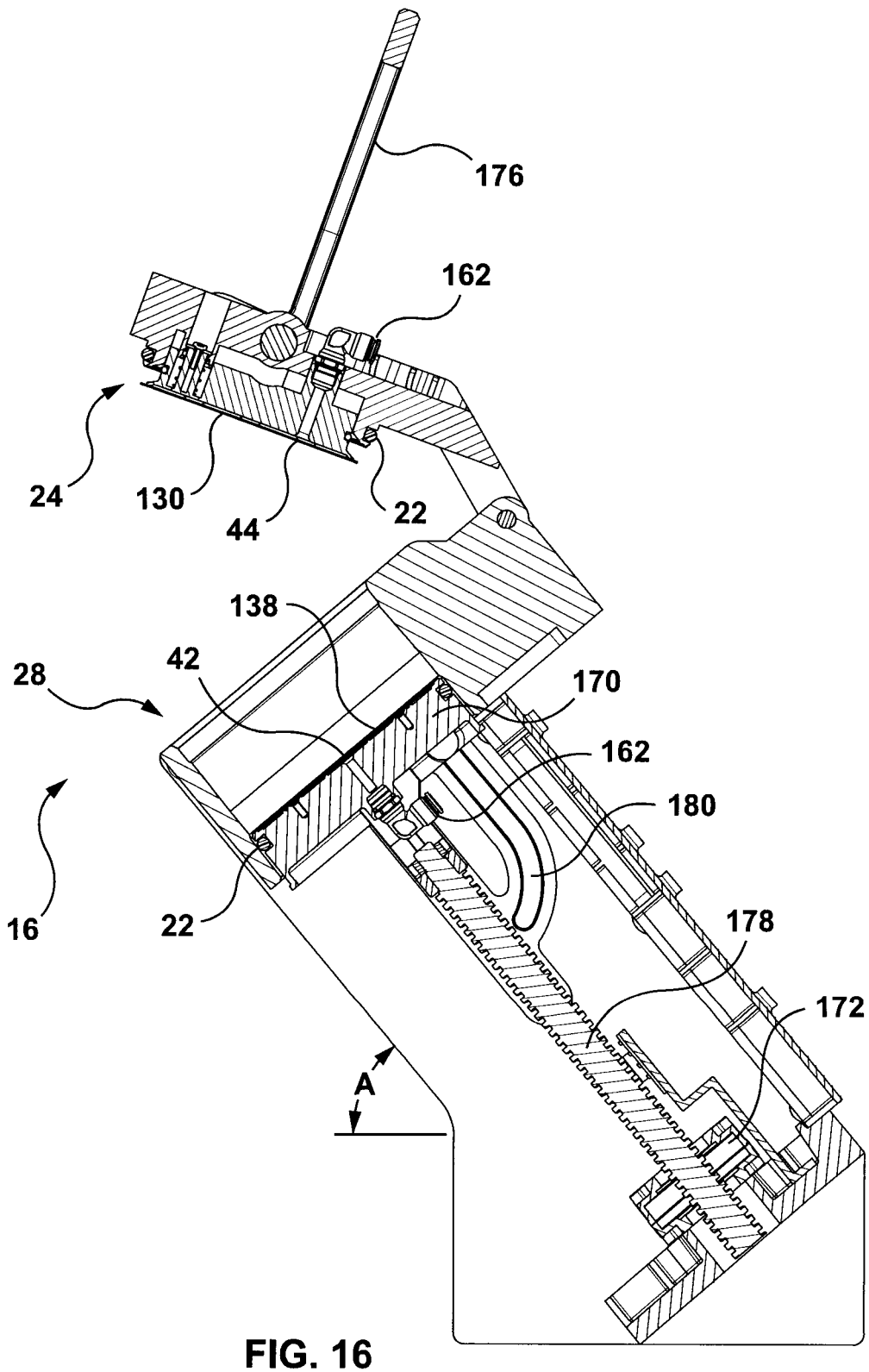
FIG. 16 is a side sectional view of a brew chamber and pod ejector in accordance with the present invention, where the brew chamber is disposed in an open position.
Figure 17:
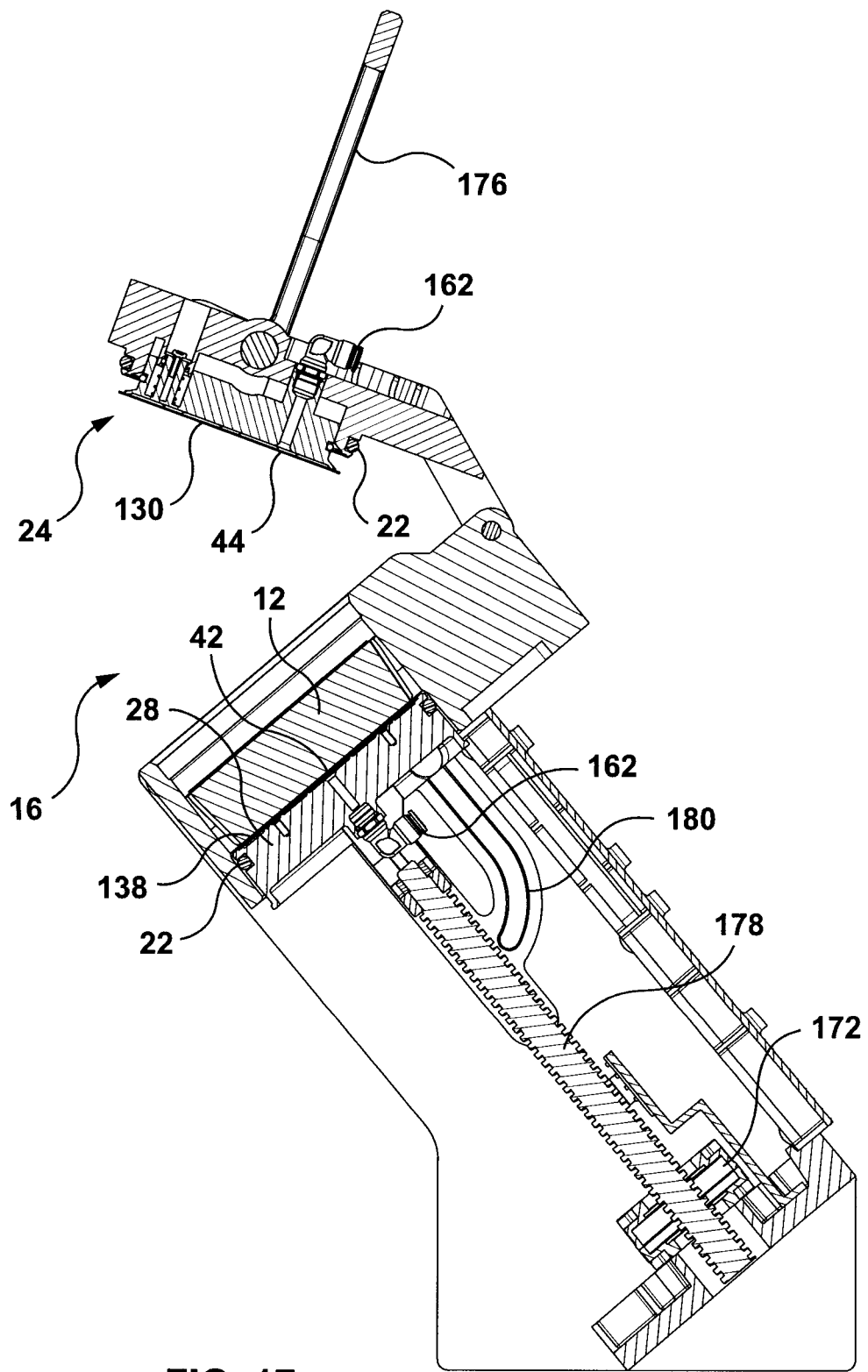
FIG. 17 is a side sectional view of the brew chamber and pod ejector of FIG. 16, where the brew chamber is disposed in an open position with a pod disposed in the brew chamber.
Figure 18:
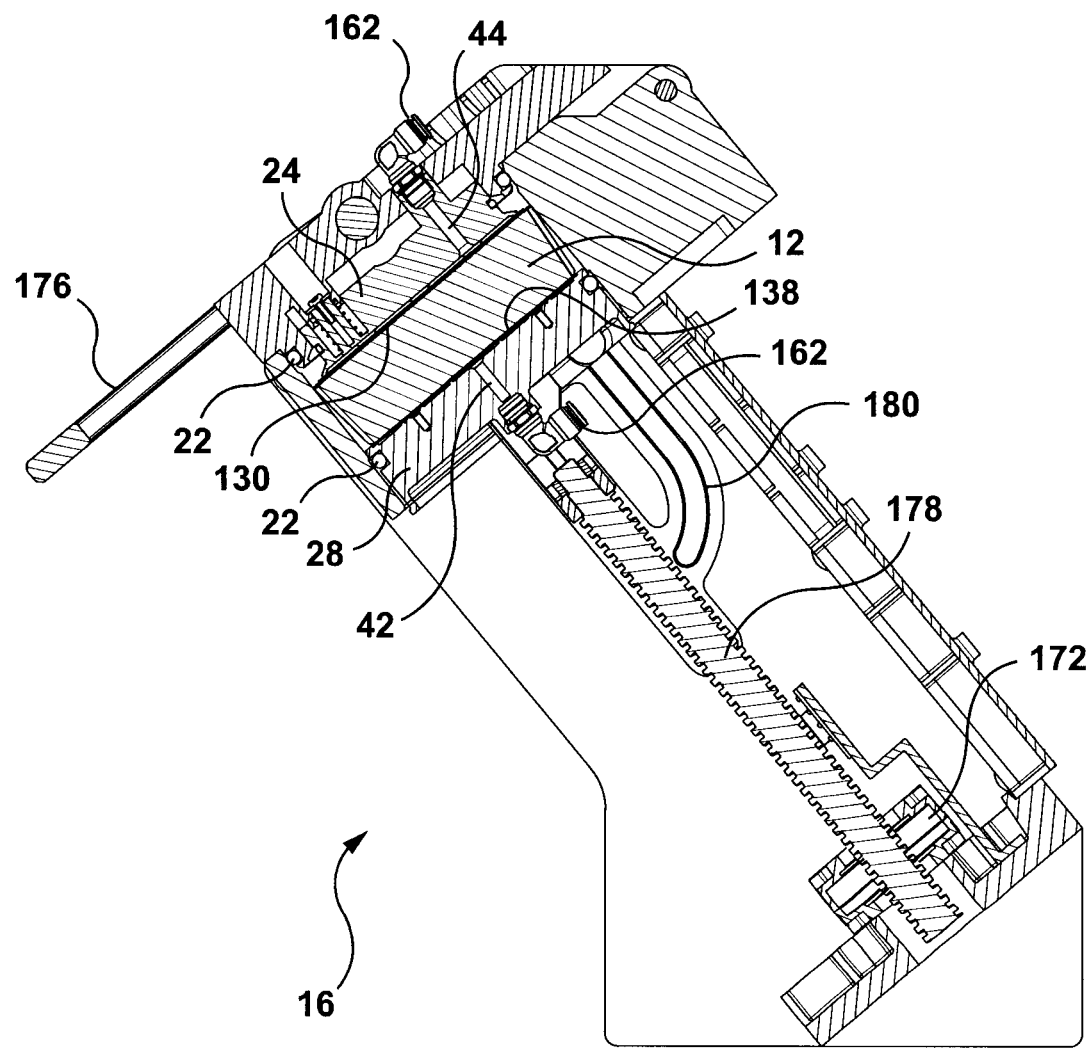
FIG. 18 is a side sectional view of the brew chamber and pod ejector of FIG. 16, where the brew chamber is disposed in a closed position with a pod disposed in the brew chamber.
Figure 19:
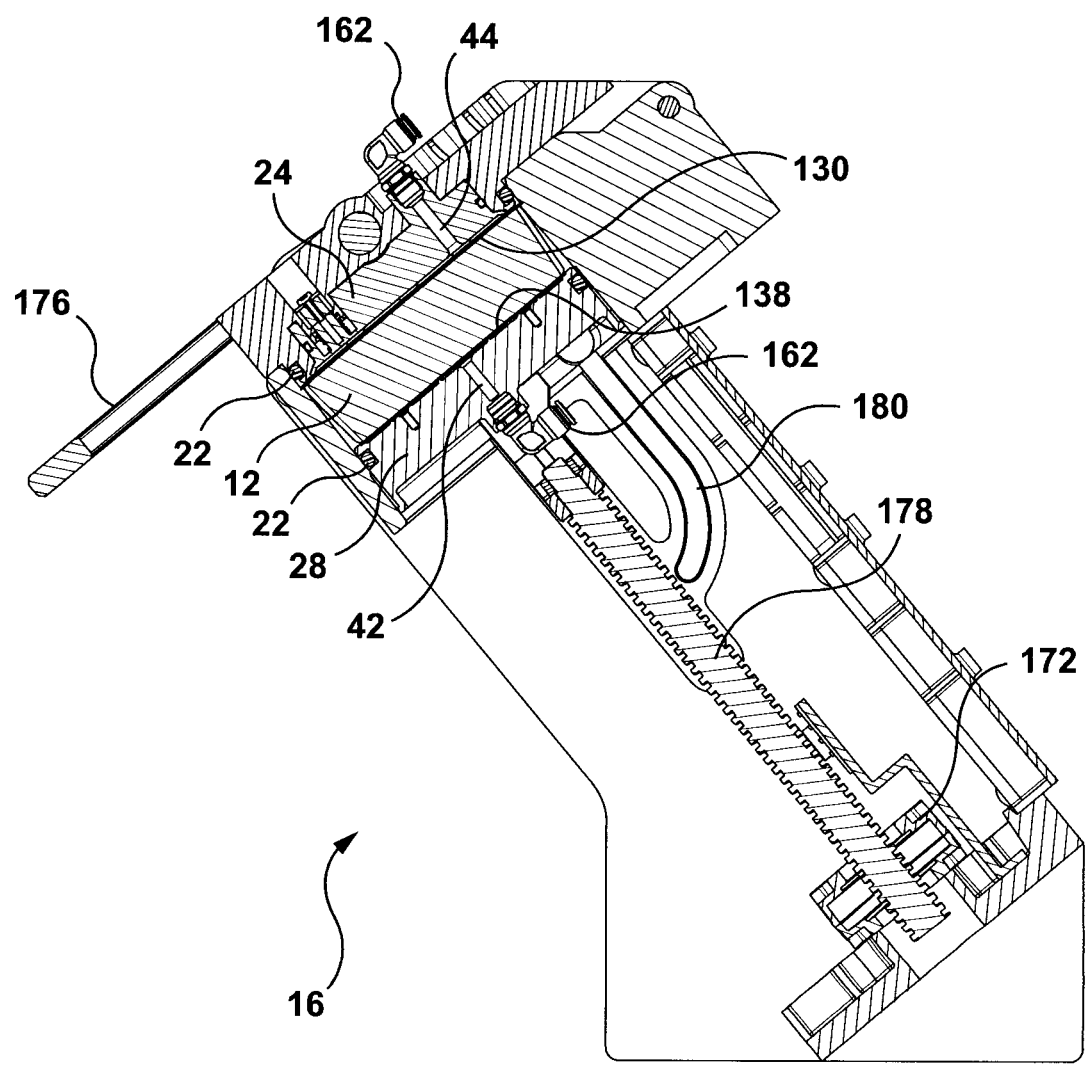
FIG. 19 is a side sectional view of the brew chamber and pod ejector of FIG. 16, where the base of the brew chamber is moved toward the lid of the brew chamber.
Figure 20:
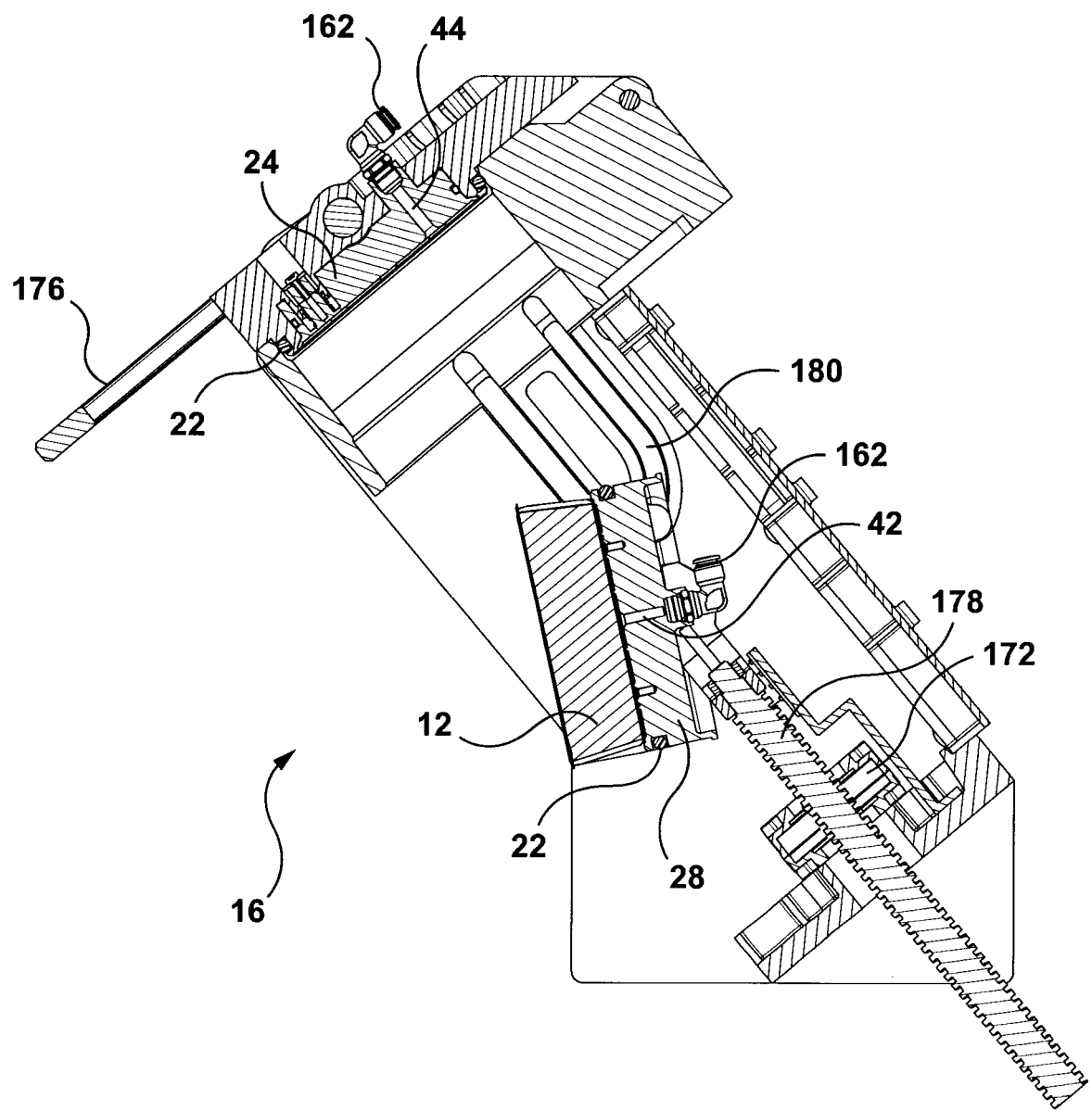
FIG. 20 is a side sectional view of the brew chamber and pod ejector of FIG. 16, where the base of the brew chamber is moved away from the brew chamber to eject the pod.

The figures show brew chamber 16 at various stages of the brewing cycle. In FIG. 16, first (top) portion 24 or lid of brew chamber 16 is open, ready for insertion of a pod 12. In FIG. 17, pod 12 has been inserted into second (bottom) portion 28 of brew chamber 16. In FIG. 18, top portion 24 of brew chamber 16 is closed. In FIG. 19, the interior depth of brew chamber 16 has been adjusted to fit the pod 12 dimensions and brewing can take place. In FIG. 20, the base of the second portion 28 of brew chamber 16 has been opened and pod 12 is being ejected.

Referring to FIGS. 16 to 20, brew chamber 16 is disposed at an angle A to facilitate insertion of pod 12, and to allow pod 12 to be ejected to the front of a motor mechanism 172. Brew chamber 16 comprises first (top) portion 24 and second (bottom) portion 28. Top portion 24 comprises a lid 174 that may be opened and closed manually and locked in a closed position with the use of a handle 176 which is linked to a latching mechanism (not shown).

First portion 24 includes an elastomeric sealing element or gasket 22 to seal against the inner surface of brew chamber 16. It also includes a fluid distribution plate 130 with a number of perforations 136 for distributing fluid flow evenly across the surface of pod 12.

Second portion 28 includes a base 170 that may be moved towards or away from first portion 24 with motor mechanism 172. Base 170 further includes a sealing element or gasket 22 and a fluid distribution plate 138 which are similar to those in first portion 24. The movement of brew chamber base 170 is controlled by a threaded rod 178 which is moved by motor mechanism 172.

During the pod ejection phase, brew chamber base 170 is rotated or pivoted as it lowers in order to facilitate ejection of pod 12 into a spent pod receptacle (not shown). This rotation is controlled by cam followers (not shown) moving through tracks 180.

After brew chamber lid 174 is closed, brew chamber base 170 moves towards lid 174 to reduce the interior depth of brew chamber 16 to match the size of pod 12. This may be controlled through time, position or feedback resistance measured from motor mechanism 172.

During the brewing phase, fluid is introduced through inlet 42 and second perforated plate 138 in brew chamber base 170, flows through the pod 12 and exits through first perforated plate 130 and outlet 44 in brew chamber lid 174. This direction of flow allows entrapped air to be more easily removed from brew chamber 16, ensuring more complete wetting of infusible ingredients 14 and optimizing extraction efficiency. The brewing sequence may include one or more steps comprising single-pass flow and recirculating flow. For example:

Stage 1: Fluid such as water is pumped through brew chamber 16 at a low flowrate and a relatively low pressure of between 1-3 atm to purge air from brew chamber 16, wet the infusible materials 14 and dispense an initial volume of product into receptacle 30.

Stage 2: Product is recirculated from receptacle 30 through brew chamber 16 and back to receptacle 30 at a pressure in the range of 1-3 atm to purge the remaining air from the system.

Stage 3: Product is recirculated from receptacle 30 through brew chamber 16 and back to receptacle 30 at a high velocity and higher pressure in the range of 3-5 atm to optimize extraction. Recirculating with only a portion of the final desired volume may have a beneficial impact on the taste of the product, for instance this has been found to reduce the prevalence of bitter and roasty tastes in the final coffee product.

Stage 4: Water is pumped through brew chamber 16 and into receptacle 30 to purge product from the spent infusible materials and the interior flow path of machine 10 also diluting the product closer to desired strength.

Stage 5: The flow direction is reversed, and air is pushed into brew chamber 16 through first perforated plate 130 in first portion 24, pushing residual water/coffee out of brew chamber 16 through second perforated plate 138 in second portion 28. This direction of flow allows entrapped fluid to be more easily purged from brew chamber 16, resulting in a drier spent pod 12 which is easier to dispose.

Figure 22:
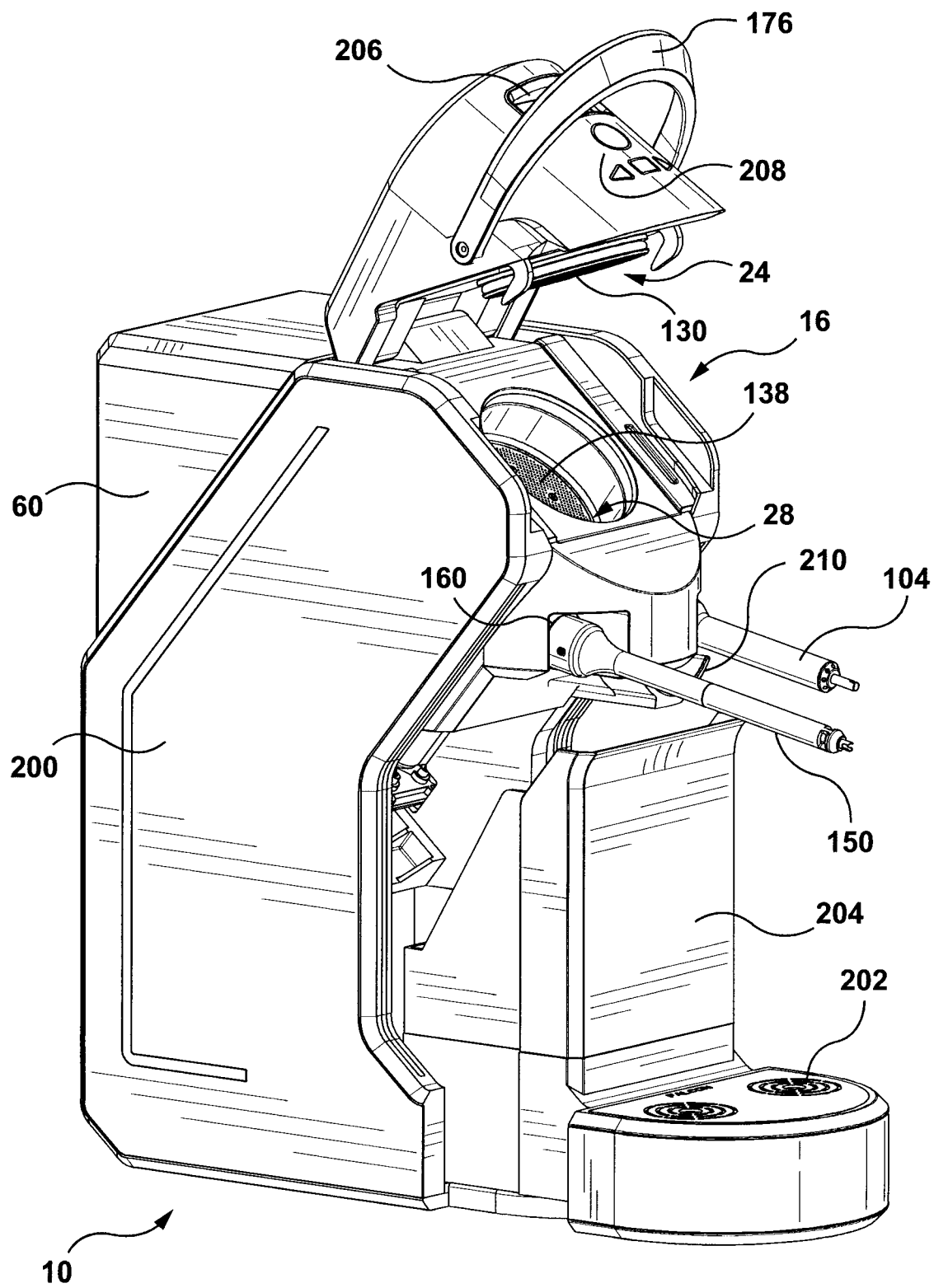
FIG. 22 is a perspective, partially exploded, view of the beverage preparation system of FIG. 21.
Figure 23:
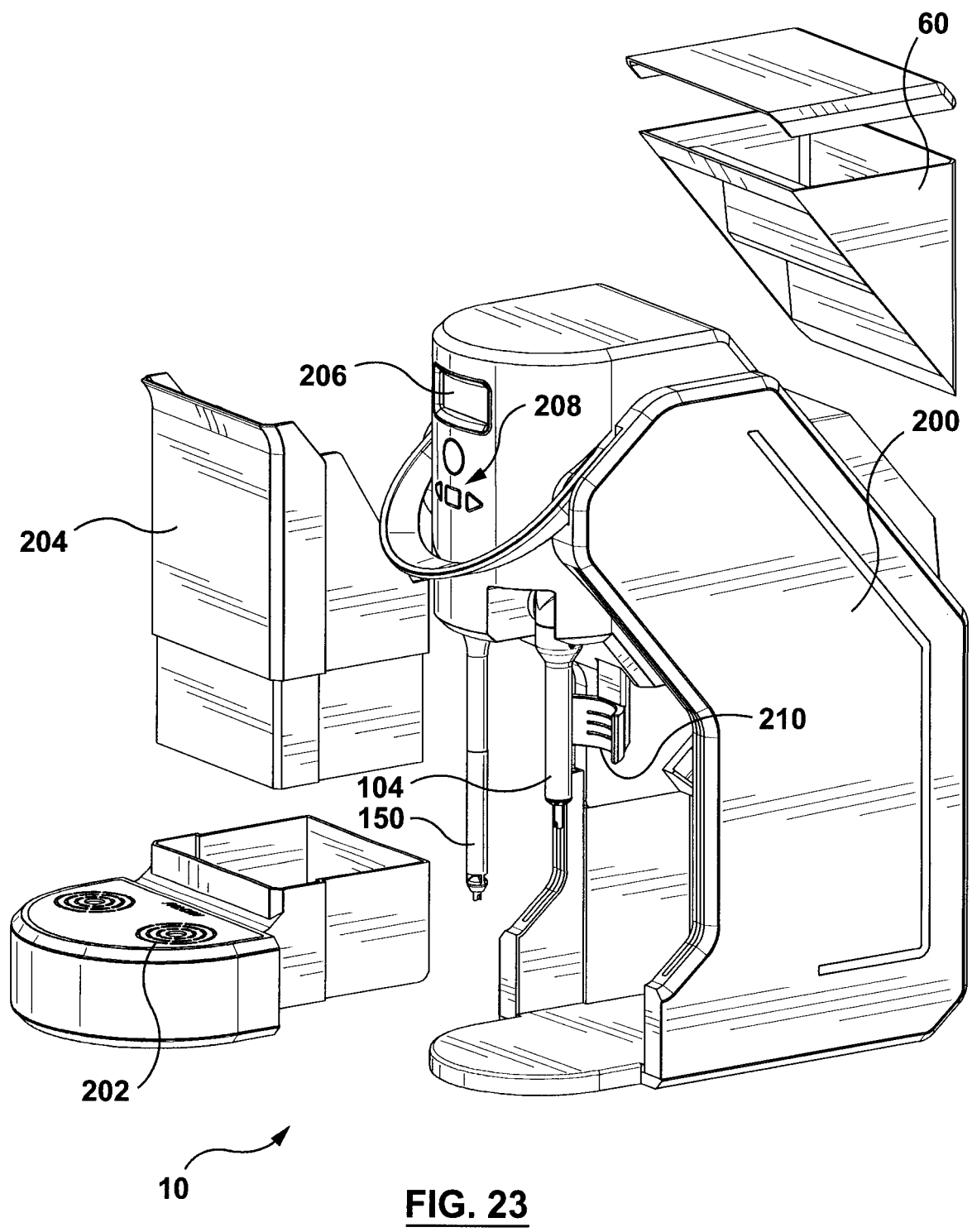
FIG. 23 is a perspective exploded view of the beverage preparation system of FIG. 21.

Referring to FIGS. 21 to 23, a preferred embodiment of a machine 10 is shown. The same reference numerals are used to refer to similar elements in the earlier described embodiments.

Machine 10 includes a housing 200 that supports tank 60, brew chamber 16, brewing wand 150 and nitro wand 104. Housing 200 contains pumps, valves, sensors and controls for operating machine 10 as shown schematically in FIG. 25 and described more fully below.

Housing 200 further includes a drip tray 202 for collecting fluid that may drip or overflow from wands 104, 150 or receptacles 30. Drip tray 202 may be slidably removed from housing 200 for purposes of cleaning. A bin 204 is also provided for collecting used pods 12 that are ejected into bin 204 following use in machine 10. Bin 204 is also removable from housing 200 for purposes of emptying and cleaning.

A display screen 206 and controls 208 are disposed on housing 200 and connected to a control system (not shown) for allowing a user to select desired operations of machine 10. A switch plate 210 is provided behind nitro wand 104 and connected to control system to activate operation of the nitro brew sequence.

Figure 24:
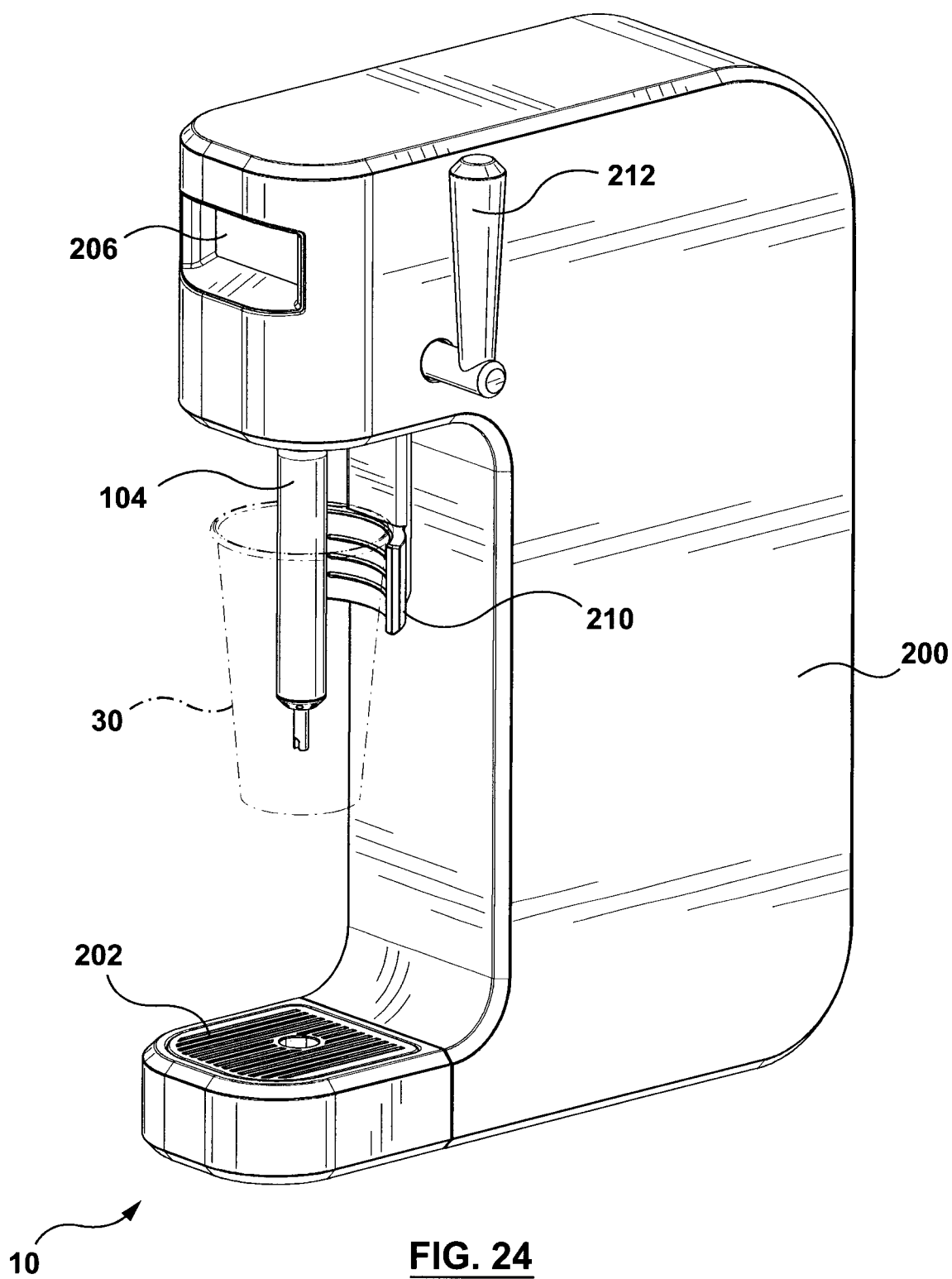
FIG. 24 is a perspective view of a beverage preparation system in accordance with another embodiment of the present invention.

Referring to FIG. 24, a preferred embodiment of a machine 10 for use solely to produce nitro brew beverages is shown. The same reference numerals are used to refer to similar elements in the earlier described embodiments.

Machine 10 includes a housing 200 that supports nitro wand 104 and drip tray 202. A depressable switch plate 210 is provided behind nitro wand 104 and connected to control system (not shown) to activate operation of the nitro brew sequence. A handle 212 may be provided in addition to or instead of switch plate 210 for allowing a user to activate and control the nitro brew sequence.

Housing 200 contains pumps, valves, sensors and controls for operating machine 10 as shown schematically in FIG. 26 and described more fully below.

Figure 25:
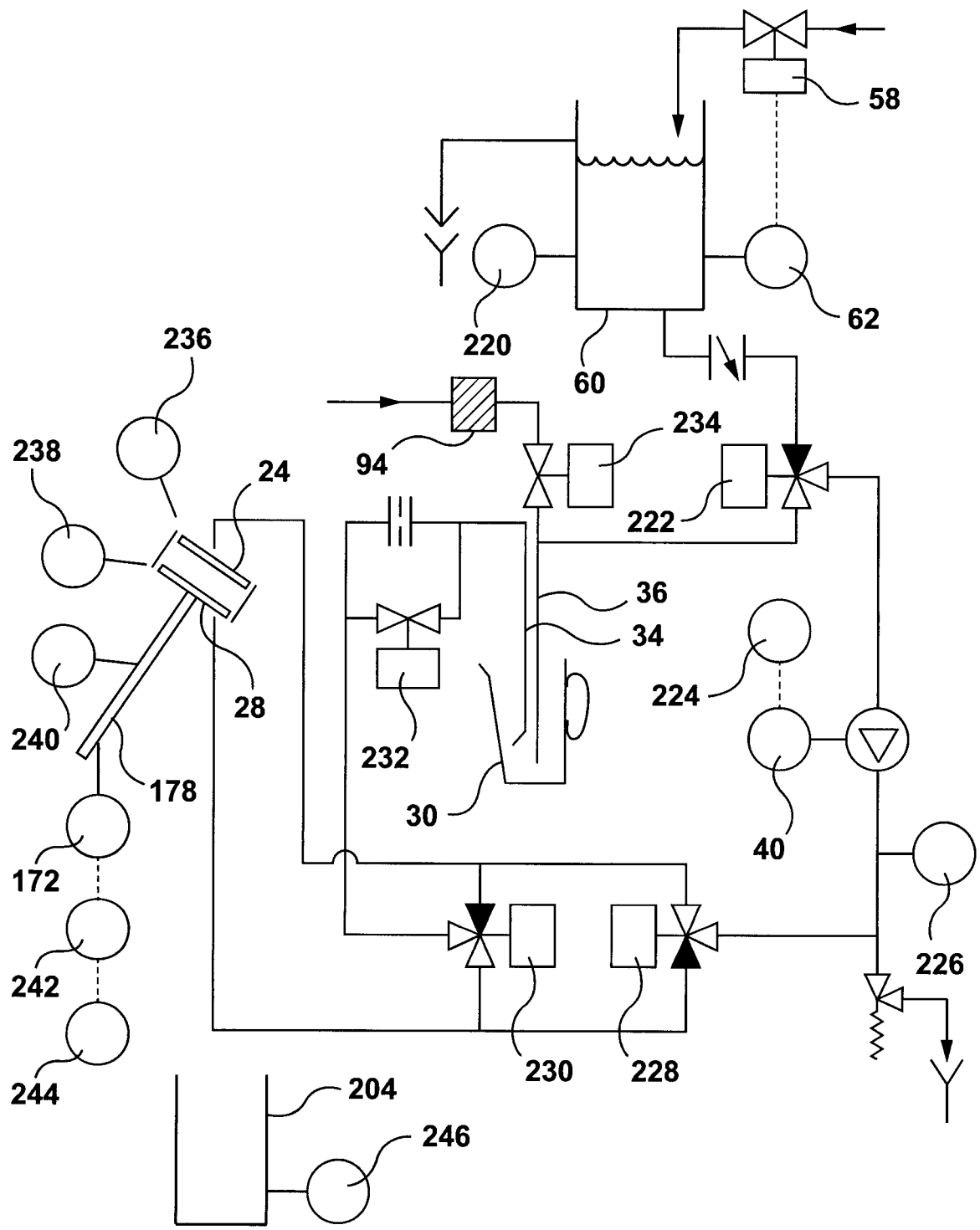
FIG. 25 is a schematic view of the brewing component of the beverage preparation system of FIG. 21.

Referring to FIG. 25, a schematic representation of the controls of machine 10 shown in FIGS. 21-23 is provided. The same reference numerals are used to refer to similar elements in the earlier described embodiments.

Machine 10 includes fluid inlet valve 58 for controlling the flow of fluid (such as water) to tank 60 from a fluid supply. A level sensor 62 disposed in tank 60 communicates with fluid inlet valve 58 through control system to ensure that the desired amount of fluid is contained in tank 60. Tank 60 further includes a temperature sensor 220 in communication with control system to ensure that the fluid contained in tank 60 is in a desired temperature range.

A recirculation valve 222 is disposed between tank 60 and both fluid pump 40 and receptacle 30 to control the recirculation of fluid. Fluid pump 40 includes a fluid pump encoder 224 that measures the volume of water being pumped by fluid pump 40 to brew chamber 16. A fluid pressure sensor 226 is disposed between fluid pump 40 and brew chamber 16 to ensure that the pressure of fluid being pumped to brew chamber 16 is in a desired range.

A brew chamber inlet diverge valve 228 is located between fluid pump 40 and inlet 42 of brew chamber 16 to control the flow of fluid to brew chamber 16. A brew chamber outlet diverge valve 230 is similarly located between outlet 44 of brew chamber 16 and receptacle 30 to control the flow of fluid to receptacle 30. Receptacle further includes a backpressure bypass valve 232.

Machine 10 further includes gas inlet valve 234 for controlling the flow of gas (such as air) through a filter from a gas supply (such as the air surrounding machine 10). Gas from gas inlet valve 234 is directed through recirculation valve 222 when it is desired to purge air through the fluid lines and brew chamber 16. Brew chamber 16 and pod ejection system include a number of sensors in communication with control system for controlling the brewing and pod ejection cycles. A brew chamber sensor 236 is provided for sensing when brew chamber 16 is closed prior to activation of the brewing cycle. A first position sensor 238 is provided for sensing when brew chamber base 170 is in a first position for receiving pod 12. A second position sensor 240 is provided for sensing when base 170 is in a second position for ejecting pod 12. Motor mechanism 172 for moving base 170 between a pod loading and pod eject position includes eject encoder 242 for measuring motor speed and eject ammeter 244 for measuring motor current flow. A bin sensor 246 is also provided for sensing when bin 204 is full of pods 12.

Figure 26:
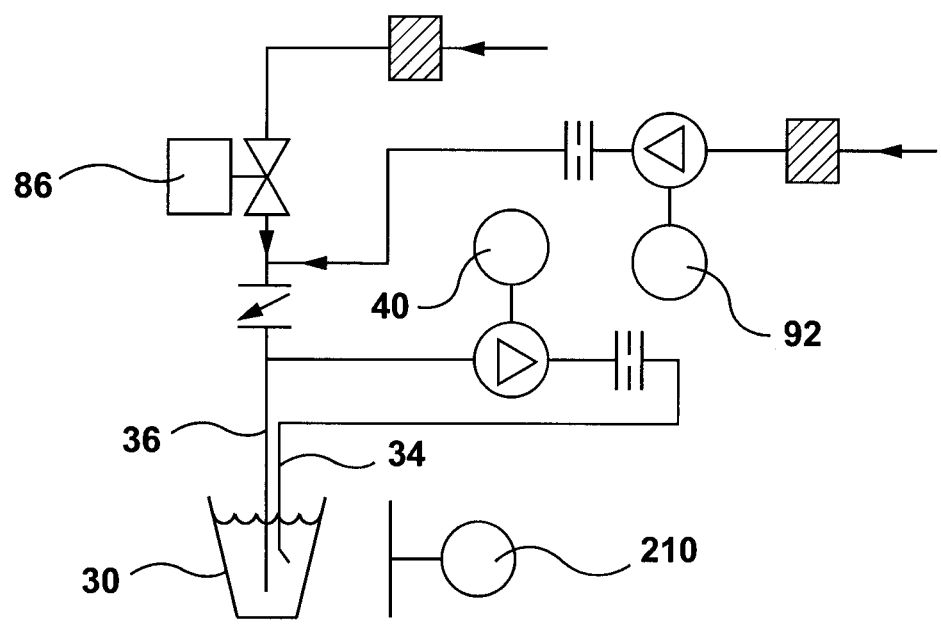
FIG. 26 is a schematic view of the nitro component of the beverage preparation system of FIG. 21 and FIG. 24.

Referring to FIG. 26, a schematic representation of the controls of machine 10 shown in FIG. 24 is provided. The same reference numerals are used to refer to similar elements in the earlier described embodiments.

Machine 10 includes fluid pump 40 for pumping fluid from receptacle 30 through inlet tube 36 for receiving an injection of gas (such as air) and then back through dispensing tube 34 to receptacle 30. Gas pump 92 is provided for pumping gas (such as air) from a gas supply (such as the air surrounding machine 10) for mixing with fluid from receptacle 30 prior to fluid passing through fluid pump 40. Machine 10 further includes gas inlet valve 86 for controlling the flow of gas (typically air) from a gas supply (typically the surrounding atmosphere of air) to inlet tube 36 leading to pump 40. Switch plate 210 is provided for actuating the nitro brew process.

Referring to FIGS. 27A-C, a pod 12 that is preferred for use in machine 10 of FIGS. 21-23 is shown. The same reference numerals are used to refer to similar elements in the earlier described embodiments.

Pod 12 comprises first filter material 110 and second filter material 112 that are sealed together at seam 18 to define an interior space 250 for receiving infusible materials 14. Pod 12 includes a side wall 252 spanning between a first filter area 254 and a second filter area 256. One of first filter material 110 and second filter material 112 is formed into a pocket defining interior space 250. The other of filter materials 110, 112 forms a layer to enclose interior space 250.

Alternatively, filter materials 110 and 112 may each be formed into a partial pocket that is sealed along seam 18 part way along side wall 252 of pod 12.

Pod has a depth D extending between first filter area 254 and second filter area 256. First filter area 254 has a first width W1 and a first area A1. Second filter area 256 has a second width W2 and second area A2. Pod 12 has an average width W (W1 plus W2 divided by 2) and an average filter area A (A1 plus A2 divided by 2). The ratio of the average width W to depth D for pod 12 is in the range of 2.5:1 to 6:1 and more preferably between 3:1 to 5:1.

At least one of first filter material 110 and second filter material 112, and in particular first filter area 254 and second filter area 256, has a tensile strength in the range of 4 N/15 mm to 100 N/15 mm, more preferably in the range of 10 N/15 mm to 50 N/15 mm and most preferably in the range of 15 N/15 mm to 30 N/15 mm. The tensile strength is measured in at least one of the machine direction or cross direction according to ISO method 1924-2.

For purposes of preparing a cold brew coffee beverage product, pod 12 contains infusible materials 14 that preferably comprise roast and ground coffee beans having a mean particle size in the range of 150-1200 micrometers, more preferably in the range of 200-900 micrometers and most preferably in the range of 250-700 micrometers. Referring to FIG. 28, a flow chart depicting a method 300 for preparing a beverage using machine 10 in accordance with the present invention is provided.

Method 300 includes step 302 of inserting infusible materials 14 into a brew chamber 16 of machine 10. Infusible materials 14 are preferably disposed in a pod 12.

Method 300 continues with step 304 of closing brew chamber 16 and activating a brewing cycle. Method 300 then continues to step 306 where machine 10 recirculates a fluid (typically water) under high pressure (preferable at least 10 atm) through brew chamber 16 for a desired period of time. Fluid may be contained in a fluid receptacle 30 and recirculated from receptacle 30 through inlet tube 36 to fluid lines leading to inlet 42 of brew chamber 16 and then through outlet 44 of brew chamber 16 through fluid lines to dispensing tube 24 disposed in receptacle 30. Inlet tube 36 and dispensing tube 34 may be contained together in a brewing wand 150. Brew chamber may include a base 170 that is adapted to be moved toward lid 174 of brew chamber 10 prior to recirculation of fluid through brew chamber 16.

Method 300 then continues with step 308 of removing infusible materials 14 from brew chamber 16 to allow a fresh supply of infusible materials to be received in brew chamber 16. Infusible materials may be contained in pod 12 and removed manually or through a pod ejection sequence where base 170 moves away from lid 174 sufficiently for base 170 to pivot and eject pod 12 into a collection bin 204.

Referring to FIG. 29, a flow chart depicting a method 400 for preparing a beverage containing a gas using machine 10 in accordance with the present invention is provided.

Machine 10 may be a combined machine such as shown in FIG. 21 for preparing a beverage using a brewing wand 150 and for infusing gas into the beverage using a nitro wand 104. Alternatively, machine may be a standalone machine such as shown in FIG. 24 for only infusing gas into the beverage using a nitro wand 104.

Method 400 includes a step 402 of drawing fluid, such as a cold brew coffee, from a fluid receptacle 30, such as a glass, through an inlet tube 36 using a fluid pump 40. Method then continues to step 404 where a gas, such as air or nitrogen, is mixed with the fluid prior to the fluid passing through fluid pump 40. Method then continues to step 406 where the fluid containing the gas is dispensed through dispensing tube 34 back into receptacle 30. Inlet tube 36 and dispensing tube 34 may be contained together in a nitro wand 104.

Method 400 then continues to step 408 where steps 402-406 are repeated for a desired time period to produce a final beverage product that is infused with gas.

While the above description provides examples of one or more processes or apparatuses, it will be appreciated that other processes or apparatuses may be within the scope of the accompanying claims.

We claim:

1. A machine for preparing a beverage product from infusible materials, the machine comprising:
   a brew chamber adapted for containing infusible materials, said brew chamber having a fluid inlet and a fluid outlet;
   a brewing wand containing both an inlet tube, for transferring fluid from a fluid receptacle to said fluid inlet of said brew chamber and a dispensing tube for transferring fluid from said fluid outlet of said brew chamber to said fluid receptacle; and
   a fluid pump for recirculating fluid through said brew chamber, said fluid pump receiving said fluid from said fluid receptacle through said inlet tube,
   wherein said brewing wand includes a hinge element for allowing a portion of said brewing wand to be moved.

2. A machine as claimed in claim 1, wherein said inlet tube and said dispensing tube define fluid flow paths in said brewing wand that are co-axial to one another.

3. A machine as claimed in claim 2, wherein said dispensing tube surrounds said inlet tube.

4. A machine as claimed in claim 2, wherein said brewing wand includes a tip that is adapted to be disposed in said fluid receptacle, and wherein said inlet tube includes a fluid opening that is disposed closer to said tip of the brewing wand than a corresponding fluid opening defined in said dispensing tube.

5. A machine as claimed in claim 4, wherein said fluid opening of said dispensing tube comprises a plurality of exit ports defined around a periphery of said brewing wand.

6. A machine as claimed in claim 5, wherein said brewing wand includes a flow control surface proximate to said exit ports for said dispensing tube for directing a laminar flow of fluid being dispensed through said dispensing tube.

7. A machine as claimed in claim 1, wherein said fluid receptacle is removably disposed in said machine.

8. A machine for preparing a beverage product from infusible materials, the machine comprising:
   a brew chamber adapted for containing infusible materials, said brew chamber having a fluid inlet and a fluid outlet;
   a brewing wand containing both an inlet tube, for transferring fluid from a fluid receptacle to said fluid inlet of said brew chamber and a dispensing tube for transferring fluid from said fluid outlet of said brew chamber to said fluid receptacle; and
   a fluid pump for recirculating fluid through said brew chamber, said fluid pump receiving said fluid from said fluid receptacle through said inlet tube,
   wherein said inlet tube and said dispensing tube define fluid flow paths in said brewing wand that are co-axial to one another.

9. A machine as claimed in claim 8, wherein said dispensing tube surrounds said inlet tube.

10. A machine as claimed in claim 8, wherein said brewing wand includes a tip that is adapted to be disposed in said fluid receptacle, and wherein said inlet tube includes a fluid opening that is disposed closer to said tip of the brewing wand than a corresponding fluid opening defined in said dispensing tube.

11. A machine as claimed in claim 10, wherein said fluid opening of said dispensing tube comprises a plurality of exit ports defined around a periphery of said brewing wand.

12. A machine as claimed in claim 10, wherein said brewing wand includes a flow control surface proximate to said exit ports for said dispensing tube for directing a laminar flow of fluid being dispensed through said dispensing tube.

13. A machine as claimed in claim 8, wherein said fluid receptacle is removably disposed in said machine.

14. A machine for preparing a beverage product from infusible materials, the machine comprising:
  a brew chamber adapted for containing infusible materials, said brew chamber having a fluid inlet and a fluid outlet;
  a brewing wand containing both an inlet tube, for transferring fluid from a fluid receptacle to said fluid inlet of said brew chamber and a dispensing tube for transferring fluid from said fluid outlet of said brew chamber to said fluid receptacle; and
  a fluid pump for recirculating fluid through said brew chamber, said fluid pump receiving said fluid from said fluid receptacle through said inlet tube,
  wherein said brew chamber has a lid portion and a base portion, wherein said lid portion may be opened and closed for accessing said brew chamber,
  wherein said base portion is movable relative to said lid portion, and
further comprising a motor mechanism for moving said base portion.

15. A machine as claimed in claim 14, wherein said base portion is rotatable to facilitate ejection of the infusible materials.

16. A machine as claimed in claim 14, wherein said fluid inlet of said brew chamber is located in or proximate to said base portion and said fluid outlet of said brew chamber is located in or proximate to said lid portion.

17. A machine as claimed in claim 14, wherein said inlet tube and said dispensing tube define fluid flow paths in said brewing wand that are co-axial to one another.

18. A machine as claimed in claim 17, wherein said dispensing tube surrounds said inlet tube.

19. A machine as claimed in claim 17, wherein said brewing wand includes a tip that is adapted to be disposed in said fluid receptacle, and wherein said inlet tube includes a fluid opening that is disposed closer to said tip of the brewing wand than a corresponding fluid opening defined in said dispensing tube.

20. A machine as claimed in claim 19, wherein said fluid opening of said dispensing tube comprises a plurality of exit ports defined around a periphery of said brewing wand.

21. A machine as claimed in claim 20, wherein said brewing wand includes a flow control surface proximate to said exit ports for said dispensing tube for directing a laminar flow of fluid being dispensed through said dispensing tube.

22. A machine as claimed in claim 14, wherein said fluid receptacle is removably disposed in said machine.

23. A machine for preparing a beverage product from infusible materials, the machine comprising:
  a brew chamber adapted for containing infusible materials, said brew chamber having a fluid inlet and a fluid outlet;
  a brewing wand containing both an inlet tube, for transferring fluid from a fluid receptacle to said fluid inlet of said brew chamber and a dispensing tube for transferring fluid from said fluid outlet of said brew chamber to said fluid receptacle;
  a fluid pump for recirculating fluid through said brew chamber, said fluid pump receiving said fluid from said fluid receptacle through said inlet tube; and
a gas inlet disposed between said inlet tube and said fluid pump for introducing a gas into said fluid that is recirculated by said fluid pump.

24. A machine as claimed in claim 23, wherein said inlet tube and said dispensing tube define fluid flow paths in said brewing wand that are co-axial to one another.

25. A machine as claimed in claim 24, wherein said dispensing tube surrounds said inlet tube.

26. A machine as claimed in claim 24, wherein said brewing wand includes a tip that is adapted to be disposed in said fluid receptacle, and wherein said inlet tube includes a fluid opening that is disposed closer to said tip of the brewing wand than a corresponding fluid opening defined in said dispensing tube.

27. A machine as claimed in claim 26, wherein said fluid opening of said dispensing tube comprises a plurality of exit ports defined around a periphery of said brewing wand.

28. A machine as claimed in claim 27, wherein said brewing wand includes a flow control surface proximate to said exit ports for said dispensing tube for directing a laminar flow of fluid being dispensed through said dispensing tube.

29. A machine as claimed in claim 23, wherein said fluid receptacle is removably disposed in said machine.

* * * * *